(12) United States Patent
Rinaldi et al.

(10) Patent No.: US 10,519,838 B2
(45) Date of Patent: Dec. 31, 2019

(54) UNIT FOR CONVERSION OF THERMAL ENERGY

(71) Applicant: C.R.F. Societa Consortile per Azioni, Orbassano (Turin) (IT)

(72) Inventors: Alex Rinaldi, Orbassano (IT); Silvano Sandri, Orbassano (IT); Paolo Graziano, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 55 days.

(21) Appl. No.: 15/800,370

(22) Filed: Nov. 1, 2017

(65) Prior Publication Data

US 2018/0135492 A1 May 17, 2018
US 2019/0162099 A9 May 30, 2019

(30) Foreign Application Priority Data

Nov. 8, 2016 (EP) .................................. 16197836

(51) Int. Cl.
*F01N 5/02* (2006.01)
*F02G 5/00* (2006.01)

(52) U.S. Cl.
CPC ............... *F01N 5/025* (2013.01); *F01N 5/02* (2013.01); *F02G 5/00* (2013.01); *F01N 2240/02* (2013.01); *Y02T 10/16* (2013.01); *Y02T 10/166* (2013.01)

(58) Field of Classification Search
CPC ... F01N 5/02; F01N 5/025; F01N 5/00; F01N 2240/02; F02G 5/00; Y02T 10/16; Y02T 10/166; H01L 35/30

USPC .............. 60/602, 320, 272, 274, 670, 597; 136/210, 218, 204, 205
See application file for complete search history.

(56) References Cited

U.S. PATENT DOCUMENTS

| | | | |
|---|---|---|---|
| 2012/0102934 A1* | 5/2012 | Magnetto | F01M 5/001 60/320 |
| 2013/0061584 A1 | 3/2013 | Gerges et al. | |
| 2013/0213606 A1 | 8/2013 | Greber | |

FOREIGN PATENT DOCUMENTS

| | | |
|---|---|---|
| EP | 2733322 A1 | 5/2014 |
| EP | 2803843 A1 | 11/2014 |
| EP | 2874191 A2 | 5/2015 |
| EP | 2874191 A3 | 6/2015 |
| EP | 2955350 A1 | 12/2015 |
| EP | 3165735 A1 | 5/2017 |
| FR | 2755727 A1 | 5/1998 |
| FR | 2859239 A1 | 3/2005 |
| GB | 2494015 A | 2/2013 |

OTHER PUBLICATIONS

European Search Report for European Application No. 16197836.6 dated Feb. 24, 2017, 8 pages.
First Office Action dated Jan. 3, 2019. 4 pages.
Second Office Action dated Feb. 7, 2019. 4 pages.

\* cited by examiner

*Primary Examiner* — Mark A Laurenzi
*Assistant Examiner* — Mickey H France
(74) *Attorney, Agent, or Firm* — RMCK Law Group PLC

(57) ABSTRACT

Described herein is a unit for conversion of thermal energy designed in particular for installation along an exhaust-gas line of a motor vehicle and configured for exchange and conversion of the thermal energy of the exhaust gases.

16 Claims, 16 Drawing Sheets

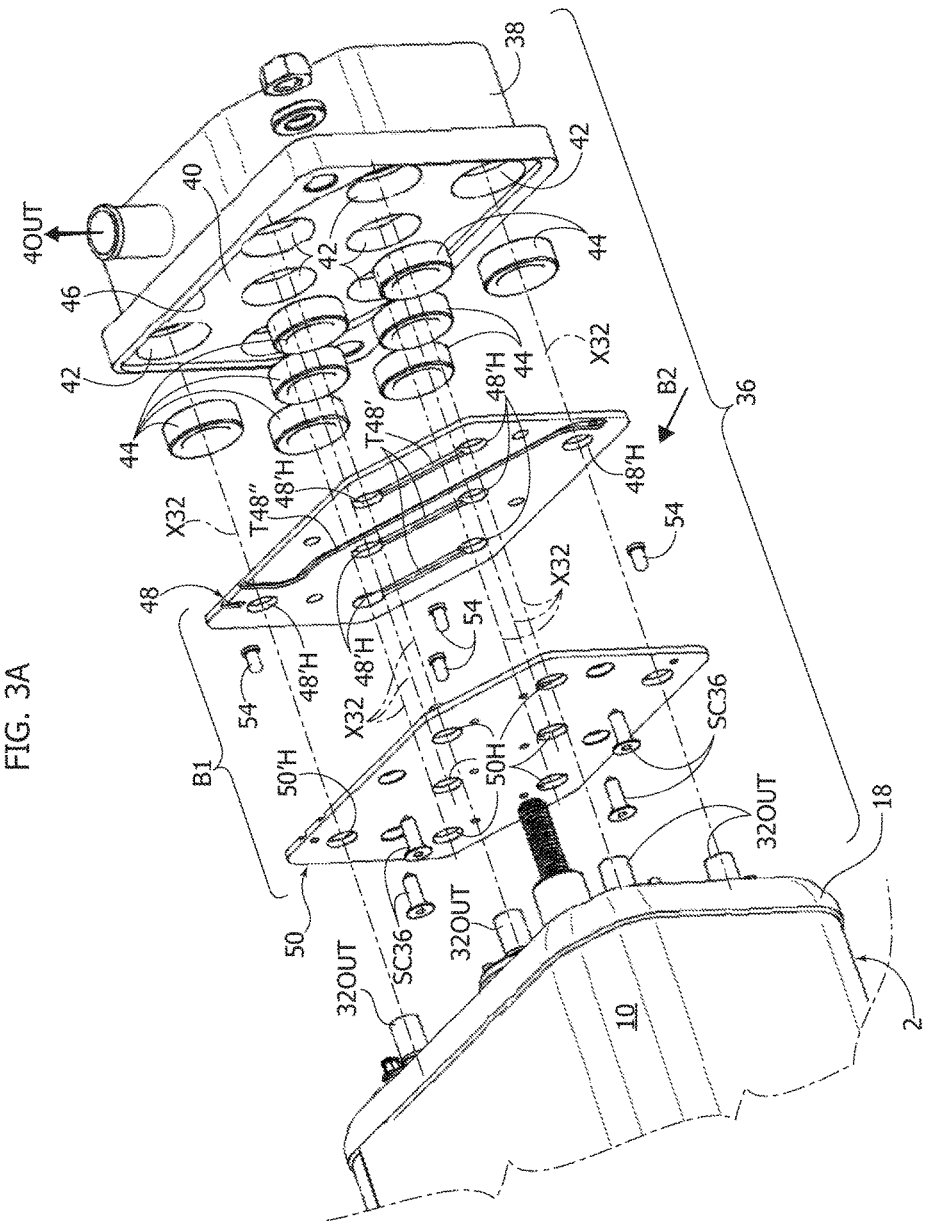

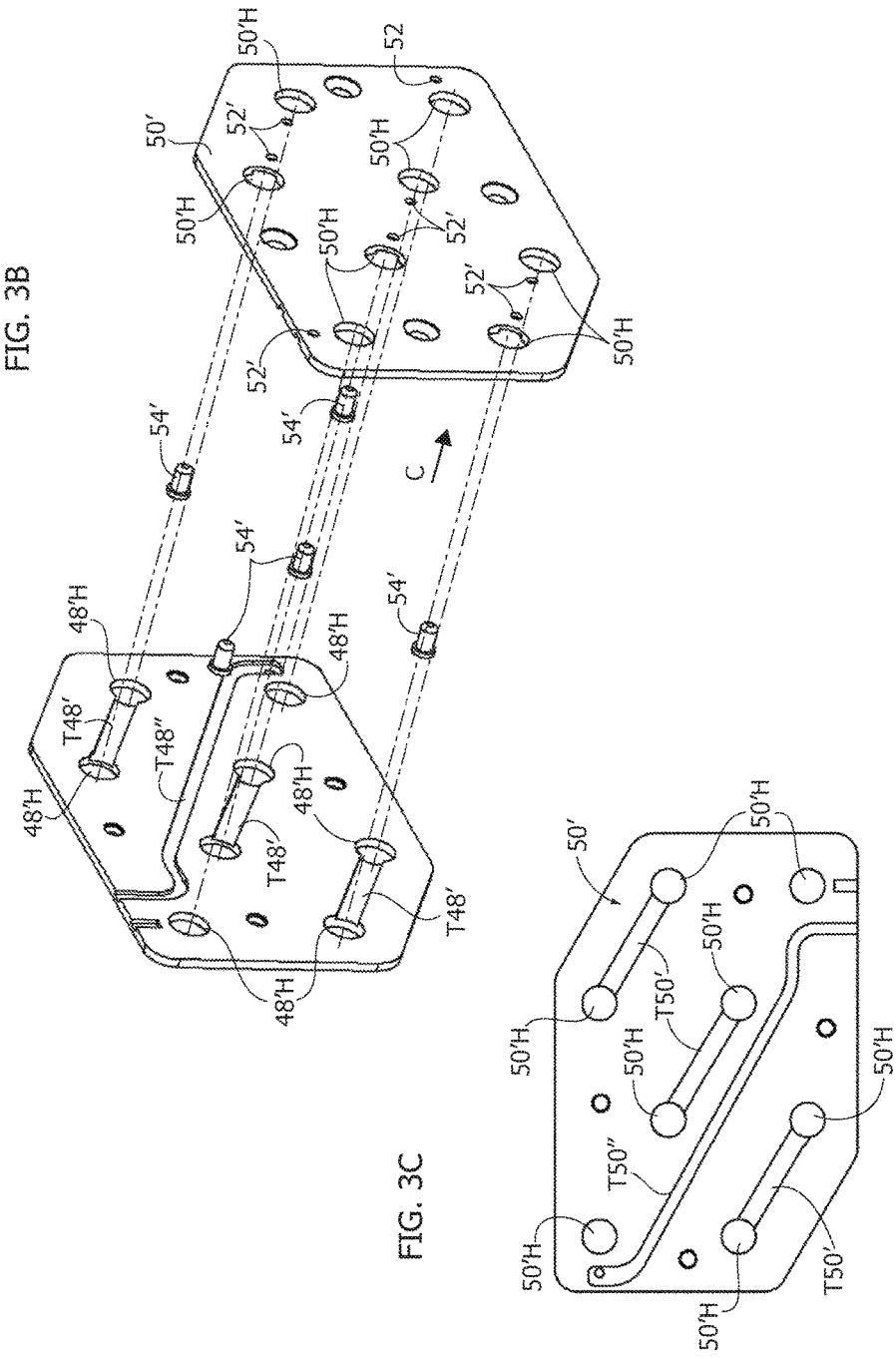

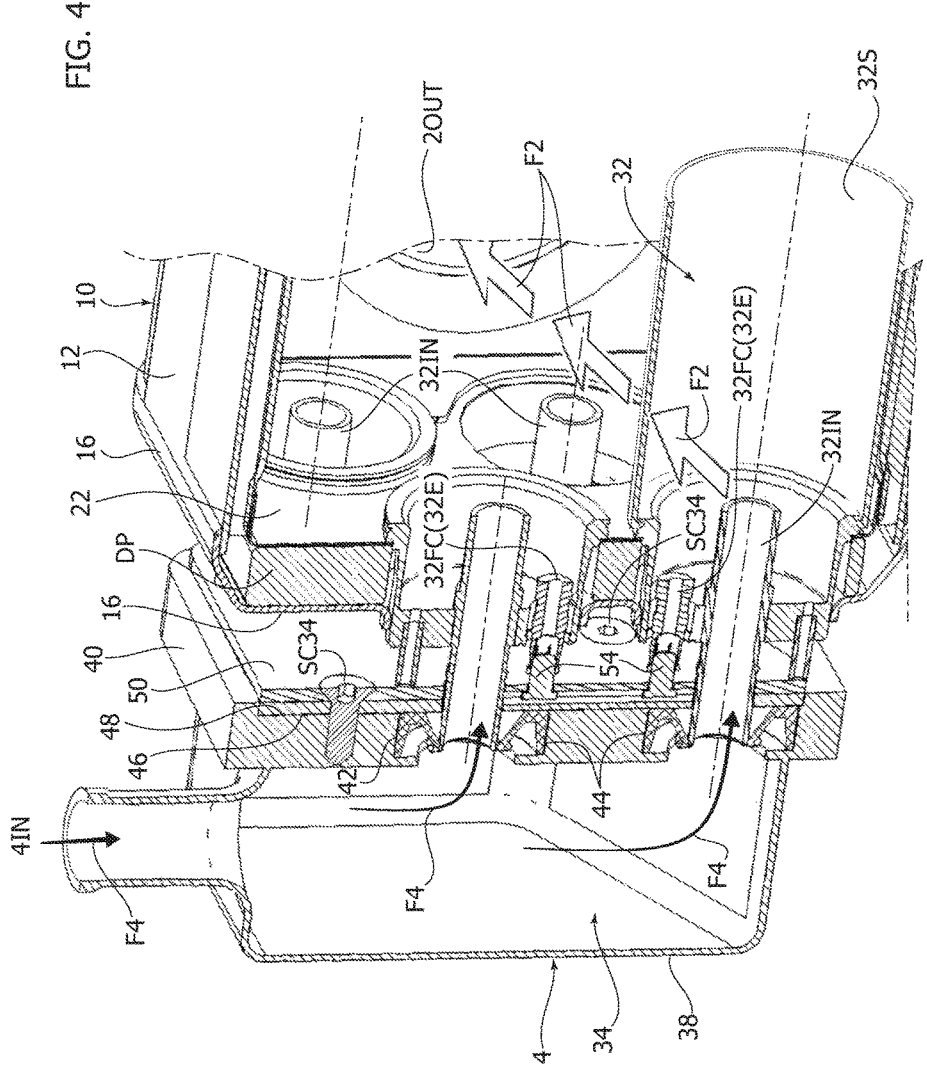

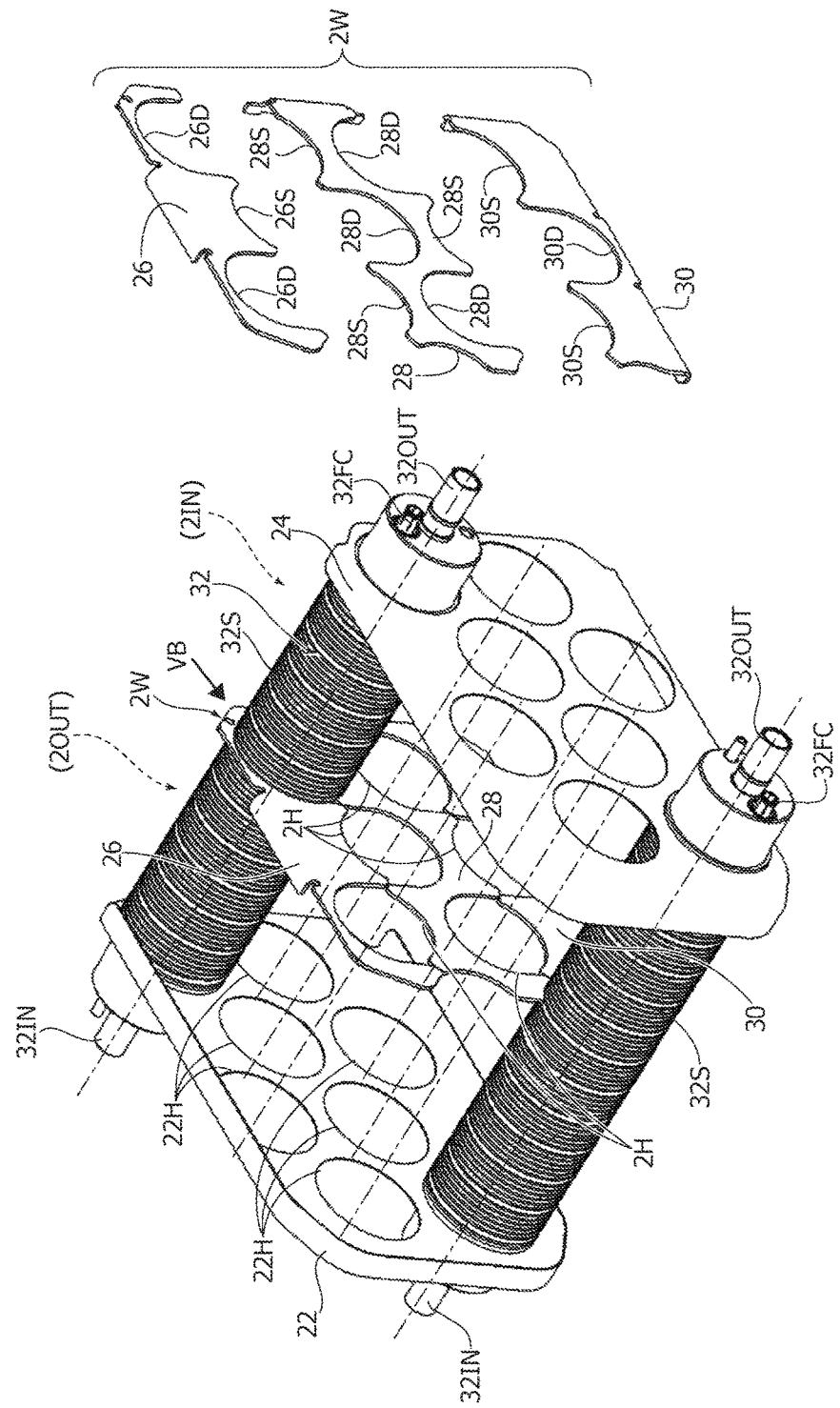

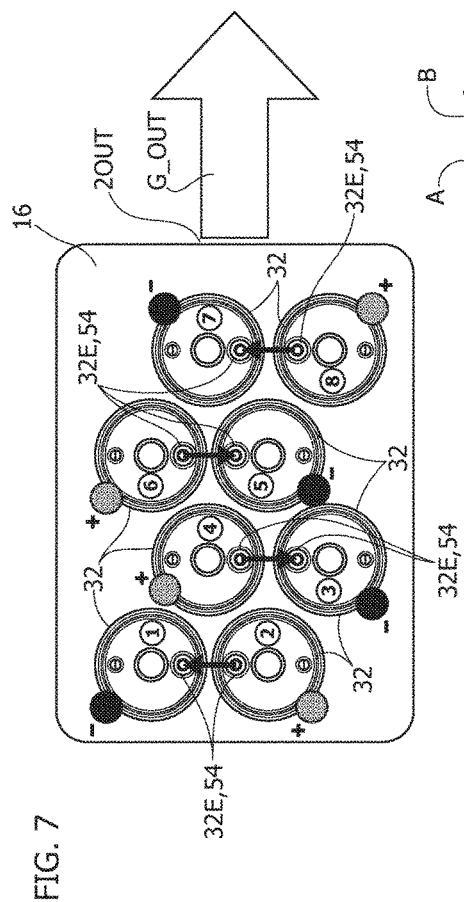
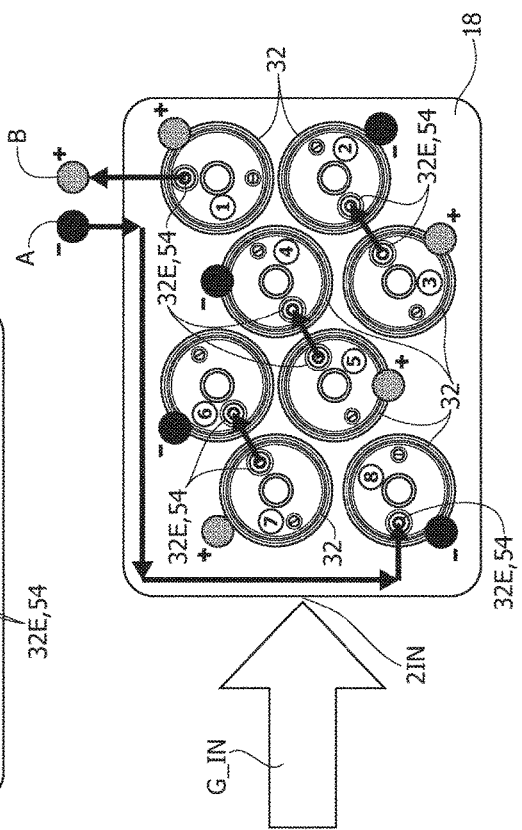

UNIT FOR CONVERSION OF THERMAL ENERGY

CROSS REFERENCE TO RELATED APPLICATIONS

This application claims priority to European Patent Application No. 16197836.6 filed on Nov. 11, 2016, the entire disclosure of which is incorporated herein by reference.

FIELD OF THE INVENTION

The present invention relates to a unit for conversion of thermal energy configured for exploitation of energy of a thermovector fluid coming from an external source, for example the exhaust gases of a vehicle equipped with internal-combustion engine.

DESCRIPTION OF THE PRIOR ART AND GENERAL TECHNICAL PROBLEM

Units for conversion of thermal energy designed for use as heat exchangers for recovery of energy from exhaust gases of a motor vehicle are known from a number of prior documents. The present Applicant has proposed a solution of this type in the European patent application published as EP 2 561 207 A1.

The solution in question is characterized by the use mainly of a plate exchanger within which the exhaust gases of the motor vehicle flow, a process that in certain circumstances may limit the performance of the system as well as the flexibility thereof.

A further solution for heat exchangers used on the exhaust-gas line (EGL) of a motor vehicle is known from the document No. US 2013/0186448 A1. This heat exchanger envisages a first heat-exchange unit and a second heat-exchange unit, each defining a flow path of a respective thermovector fluid. In particular, the first heat-exchange unit provides a flow path for hot exhaust gases coming from the internal-combustion engine, whereas the second heat-exchange unit, which is located in part immersed within the environment of the first heat-exchange unit, provides a flow path for a second thermovector fluid, which exchanges heat with the flow of exhaust gases, thus increasing temperature.

The second heat-exchange unit includes a plurality of thermoelectric cartridge elements, which are configured for providing a flow duct for the liquid that constitutes the second thermovector fluid and house within said flow duct a plurality of modules made of thermoelectric material, which are configured for generating a difference of potential when lapped by a flow of heat.

The solution illustrated in this document envisages a purely axial traversal by the first thermovector fluid, which imposes providing a bypass conduit for bypass of the flow of exhaust gases out of the first heat-exchange unit inside the casing of the exchanger or else with a line that runs parallel to the exchanger itself.

The first solution is evidently undesirable in so far as the bypass conduit for the exhaust gases is very close to the second heat-exchange unit and may consequently generate heating of the second thermovector fluid even when this is not desired, whereas the second solution is characterized by a substantial doubling of the transverse encumbrance, as well as by a considerable complication in the construction of the ensemble of conduits and ducts for circulation of the second thermovector fluid.

OBJECT OF THE INVENTION

The object of the present invention is to overcome the technical problems described previously.

In particular, the object of the present invention is to provide a unit for conversion of thermal energy that at the same time will guarantee high energy performance and contained overall dimensions, and will enable a rational organisation of the hydraulic-electrical circuitry.

SUMMARY OF THE INVENTION

The object of the present invention is achieved by a unit for conversion of thermal energy having the features forming the subject of one or more of the appended claims, which form an integral part of the technical disclosure provided herein in relation to the invention.

In particular, the object of the invention is achieved by a unit for conversion of thermal energy including a first heat-exchange unit defining a first flow path for a first thermovector fluid, wherein:

said first heat-exchange unit includes a first inlet port for said first thermovector fluid and a first outlet port for said first thermovector fluid, said first inlet port and said first outlet port being located on one and the same side of said first heat-exchange unit and having a baffle set between them so as to confer to said first flow path a substantially U-shaped geometry;

said first inlet port and first outlet port being set alongside one another straddling said baffle, in correspondence of which a valve is set for controlling the flow of said first thermovector fluid;

connected to said first inlet port is a first end of an inlet conduit, whereas a second end of said inlet conduit is configured for receiving said first thermovector fluid;

connected to said first outlet port is a first end of an outlet conduit, whereas a second end of said outlet conduit is configured for evacuation of said first thermovector fluid;

the first ends of said inlet conduit and said outlet conduit are moreover in fluid communication with one another and define a chamber that houses said valve and a second flow path that develops through said inlet conduit, said chamber, and said outlet conduit; and said valve is mobile between a first operating position in which it is configured for blocking fluid communication between the inlet conduit and the outlet conduit imposing on said first thermovector fluid passage through said first flow path, and a second operating position in which it is configured for enabling fluid communication between the inlet conduit and the outlet conduit, thus enabling said first thermovector fluid to pass through said second flow path.

BRIEF DESCRIPTION OF THE DRAWINGS

The invention will now be described with reference to the annexed drawings, which are provided purely by way of non-limiting example and wherein:

FIG. 3A is an exploded view of an ensemble indicated by the arrow III' in FIG. 1;

FIG. 3B is an exploded perspective view of a set of components denoted by the reference B1 in FIG. 3A and according to the arrow B2 in the same figure;

FIG. 3C is an orthogonal view according to the arrow C of FIG. 3B;

FIG. 4 is a cross-sectional view according to the trace IV-IV of FIG. 1;

FIG. 5 is a perspective view, with some components removed for clarity, of components present inside the conversion unit of FIG. 1, including an exploded perspective view of an ensemble of components indicated by the arrow VB;

FIGS. 7 and 8 are front schematic views of electrical connections inside the conversion unit according to the invention;

DETAILED DESCRIPTION OF PREFERRED EMBODIMENTS OF THE INVENTION

Figure 1:
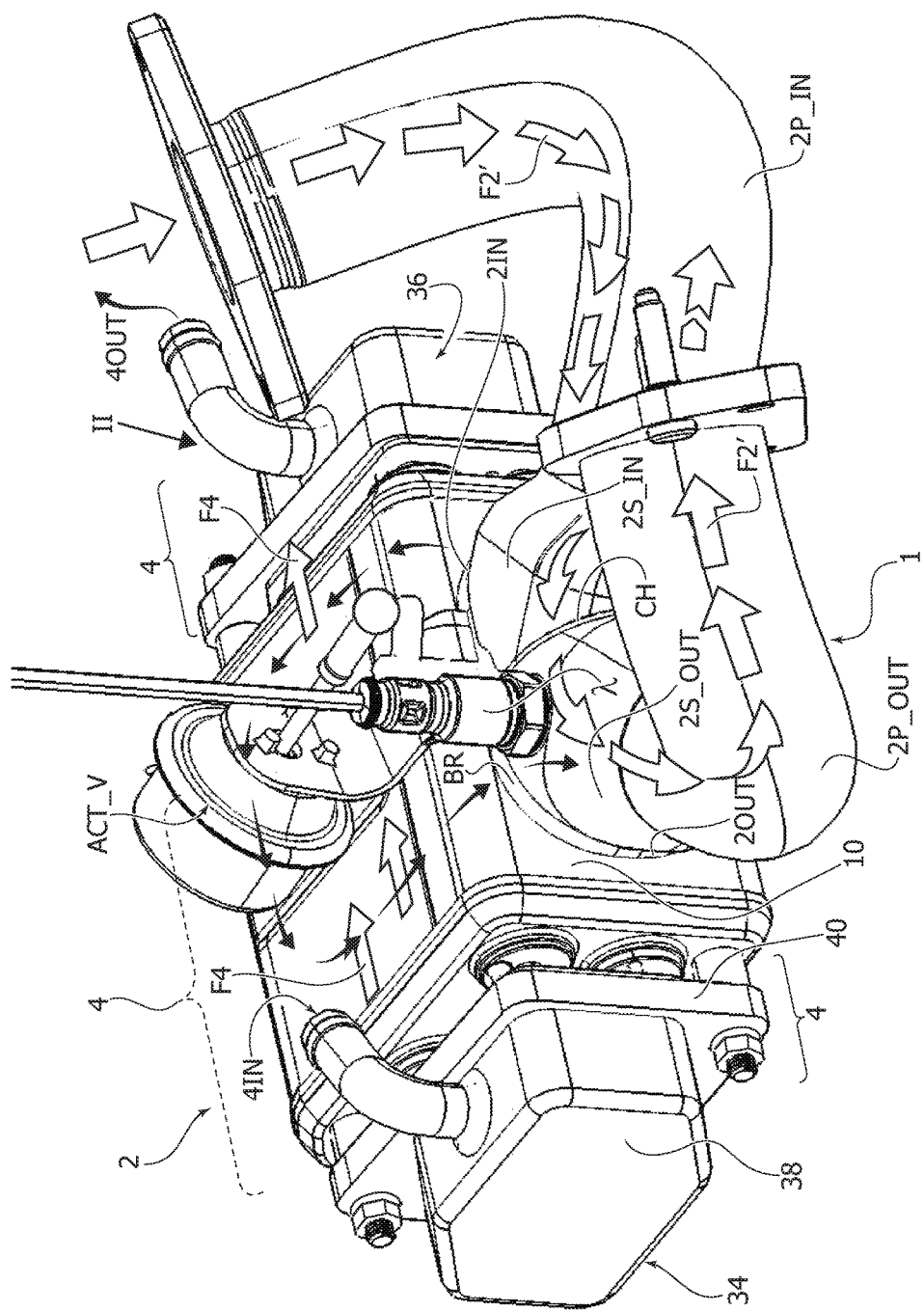
FIG. 1 is a perspective view of a unit for conversion of thermal energy according to a preferred embodiment of the invention.
Figure 1A:
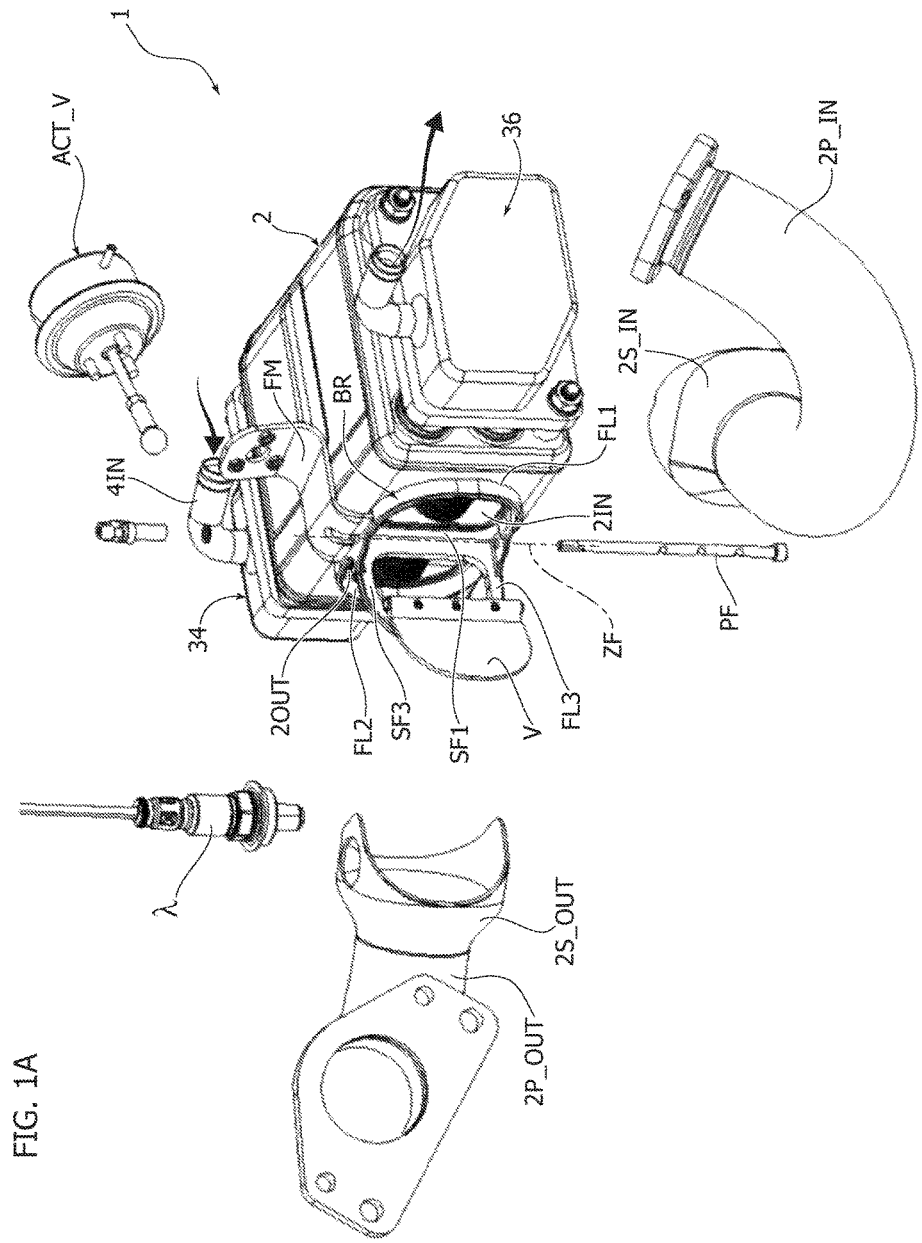
FIG. 1A is an exploded perspective view of the conversion unit of FIG. 1.
Figure 2:
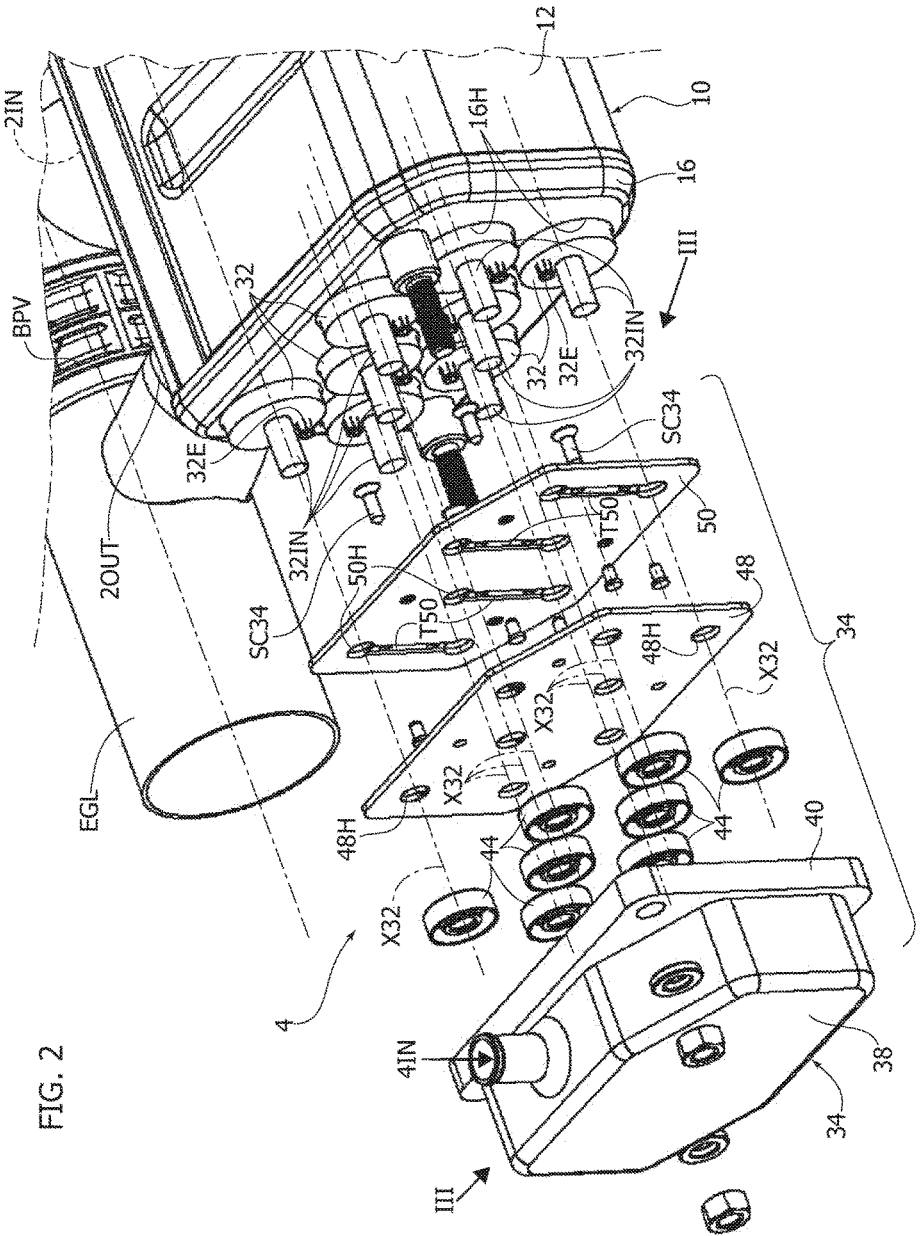
FIG. 2 is an exploded perspective view of a portion of the unit for conversion of thermal energy indicated by the arrow II of FIG. 1.
Figure 3:
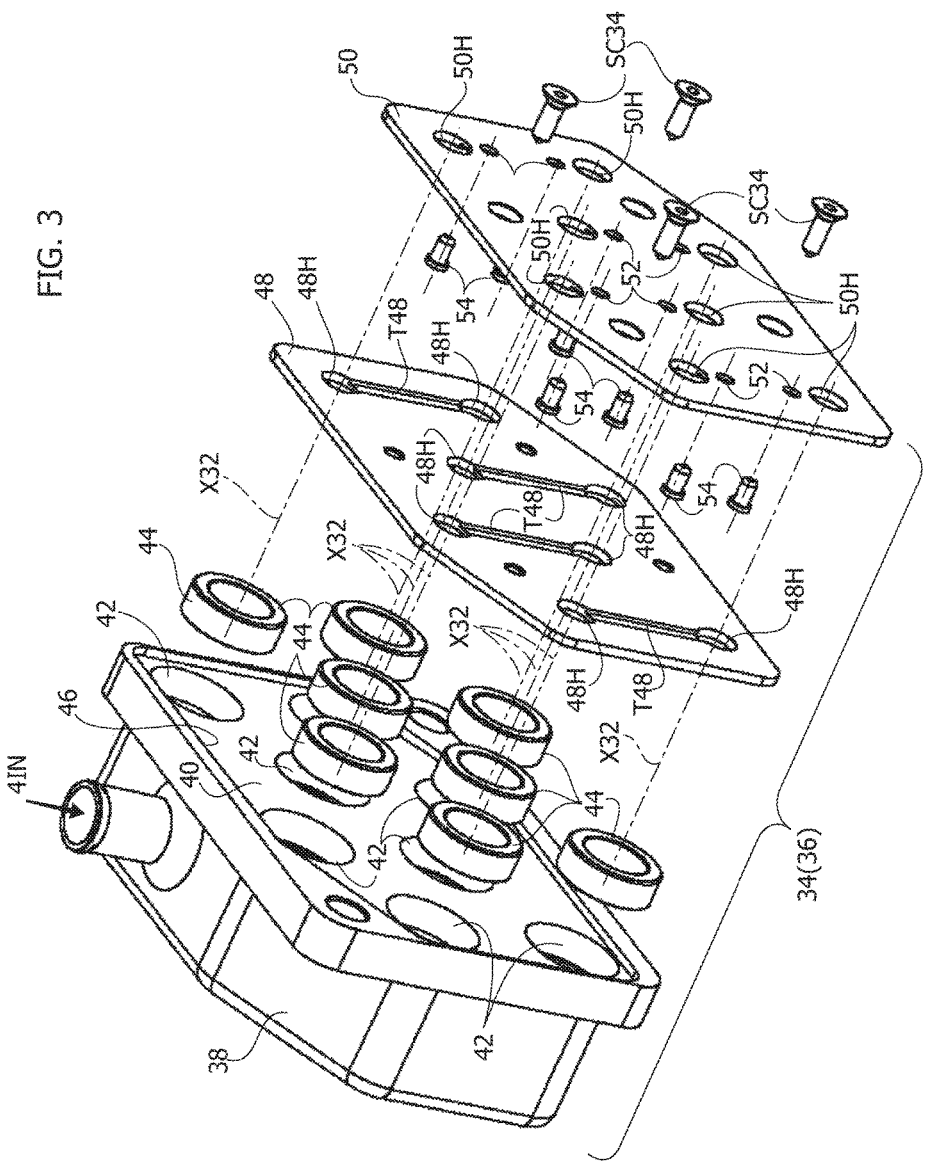
FIG. 3 is an exploded perspective view of an ensemble designated by the reference III in FIG. 2.

The reference number 1 in FIG. 1 designates as a whole a unit for conversion of thermal energy according to a preferred embodiment of the invention. The conversion unit 1 includes a first heat-exchange unit 2 defining a first flow path F2 for a first thermovector fluid. The first flow path F2 develops between a first inlet port 2IN and a first outlet port 2OUT. The first inlet port 2IN and the first outlet port 2OUT are located on one and the same side of the first heat-exchange unit 2 and have a baffle 2W set between them in such a way that a substantially U-shaped geometry is bestowed on the first flow path F2, as is represented schematically in FIG. 1.

The first inlet port 2IN and the first outlet port 2OUT are set alongside one another straddling the baffle 2W, in correspondence of which a valve V is present for controlling the flow of the first thermovector fluid. The valve V is preferentially provided as a throttle valve hinged at one end, which is rotatable about an axis ZF. Driving in rotation of the valve V is provided by a linear actuator ACT_V, which exerts its own action on a rocker connected in rotation to a pin that enables articulation of the valve V.

Connected to the first inlet port 2IN is a first end of an inlet conduit 2P_IN, whereas a second end of the inlet conduit 2P_IN is configured for receiving the first thermovector fluid. In particular, for automotive applications, the second end of the conduit 2P_IN is configured for connection to an exhaust-gas line (EGL) of the engine of the motor vehicle, in particular downstream of the unit for after-treatment of exhaust gases.

Connected to the first outlet port 2OUT is a first end of an outlet conduit 2P_OUT, whereas a second end of the outlet conduit 2P_OUT is configured for evacuation of the first thermovector fluid. In particular, for automotive applications, the second end of the conduit 2P_OUT is configured for connection upstream of the stretch of the exhaust-gas line that proceeds towards an external outlet, typically installed at the tail-end of the vehicle. Preferentially, installed on the conduit 2P_OUT is a sensor for detecting the oxygen concentration in the exhaust gases, designated by the reference λ (a traditional lambda probe or a UEGO probe).

The first ends of the aforesaid inlet conduit 2P_IN and outlet conduit 2P_OUT are moreover in fluid communication with one another and define a chamber CH that houses the valve V, and further define a second flow path F2' for the first thermovector fluid, which develops through the inlet conduit 2P_IN, the aforesaid chamber, and the outlet conduit 2P_OUT. In particular, the chamber CH within which the valve V is mobile is obtained thanks to the fact that, at the respective first ends, each of the conduits 2P_IN and 2P_OUT includes a sinus 2S_IN, 2S_OUT, the geometry of which provides a transition from the circular section of the remaining stretch of conduit to the section of the corresponding port 2IN, 2OUT. When coupled to the ports 2IN, 2OUT, the sinuses 2S_IN, 2S_OUT provide a bilobed chamber. In the preferred embodiment illustrated herein, the sinus 2S_IN defines a volume of the chamber CH within which the valve V is movable.

Figure 12:
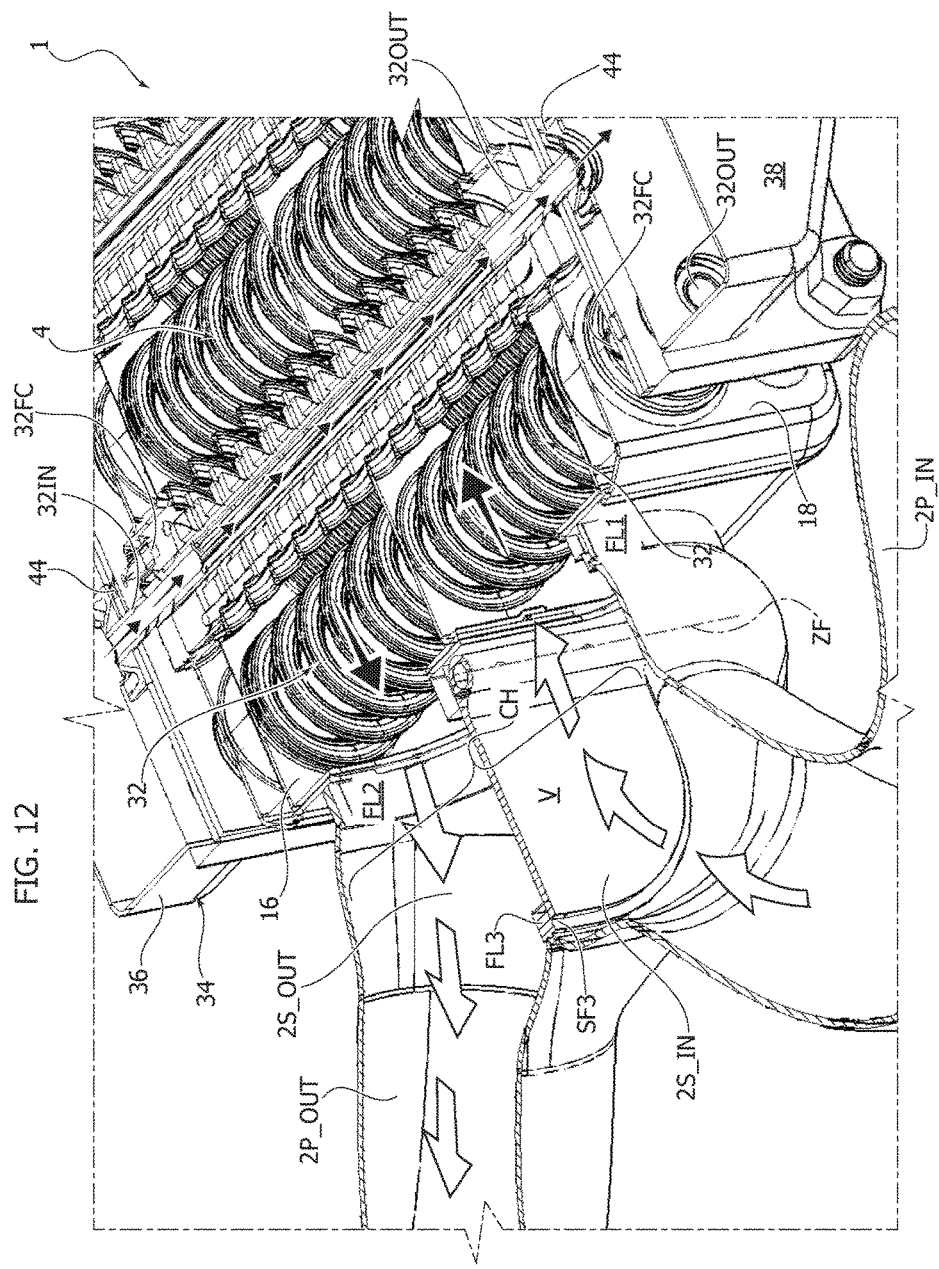

The valve V is movable between:

a first operating position (visible in FIGS. 9 and 12), where it is configured for blocking fluid communication between the inlet conduit 2P_IN and the outlet conduit 2P_OUT, forcing the first thermovector fluid to pass through the first flow path F2;

a second operating position (visible in FIG. 11), where the valve is configured for enabling fluid communication between the inlet conduit 2P_IN and the outlet conduit 2P_OUT, thus allowing the first thermovector fluid to pass through the second flow path FL2'; preferentially, in the second operating position, the port 2I is obstructed to prevent any undesired entry of thermovector fluid into the first flow path; and at least one third operating position (visible in FIG. 10), where the valve is configured for enabling a partialized fluid communication between the inlet conduit 2P_IN and the outlet conduit 2P_OUT, thus allowing the first thermovector fluid to pass through the first and second paths of flow F2, F2'; the respective flowrates depend upon the angular position of the valve V, which is modulated by the actuator ACT_V according to the needs; it is to be noted that in certain embodiments, according to the specific needs in terms of energy exchange, it might not be necessary to provide a third operating position, and in effect the actuator ACT_V can be of the discrete-positioning type (i.e., it has two discrete positions).

In the preferred embodiment, the conversion unit 1 includes a second heat-exchange unit 4 defining a third flow path F4 for a second thermovector fluid. The unit 4 is in itself optional: embodiments are possible—for certain uses—in which the unit is absent (see the ensuing description).

The third flow path F4 develops between a second inlet port 4IN and a second outlet port 4OUT.

Figure 6:
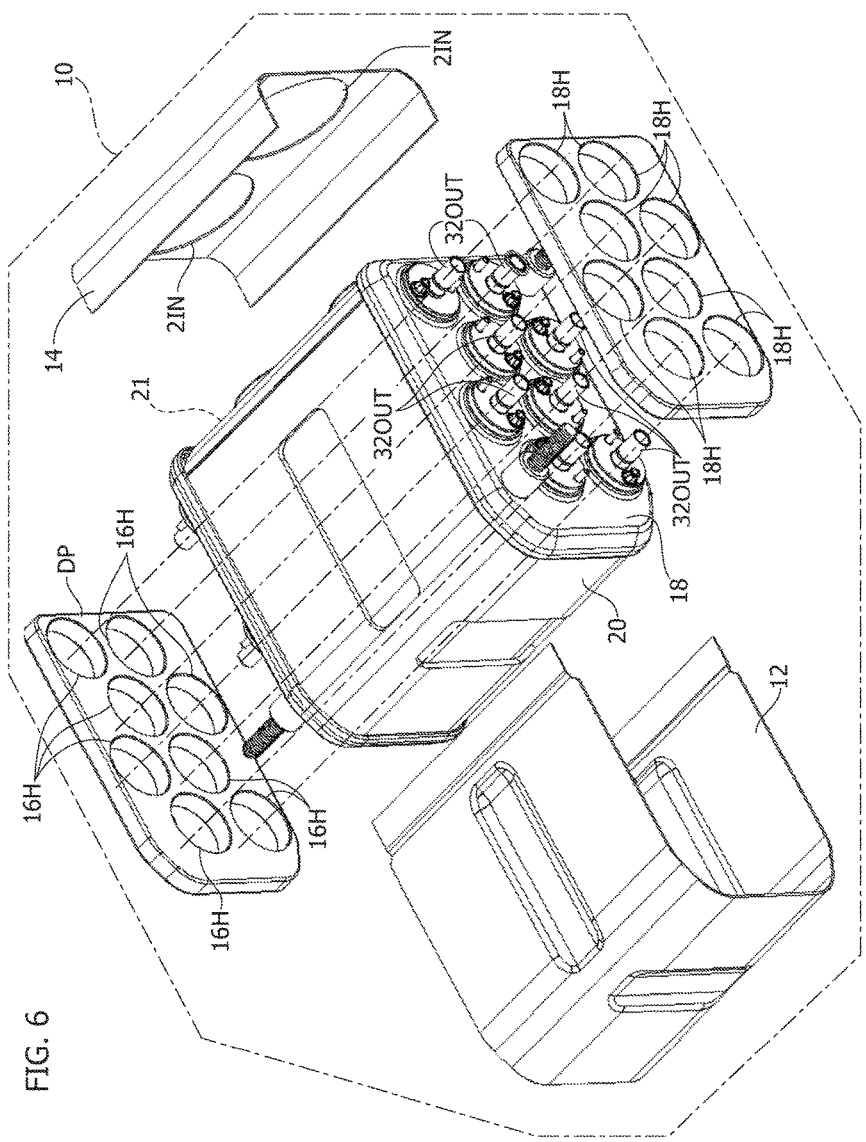
FIG. 6 is a partially exploded perspective view of a first heat-exchange unit of the conversion unit of FIG. 1.

With reference to FIGS. 1, 5, and 6, the first heat-exchange unit 2 includes a casing 10 preferably obtained by assembly of shaped metal sheets. With reference to FIGS. 5 and 6, the casing 10 has a substantially octagonal prismatic shape (or, likewise, a rectangular prismatic shape with rounded corners) and includes a set of skin metal sheets and a set of frame metal sheets. The set of skin metal sheets comprises a first skin metal sheet 12 that is substantially U-shaped, a second skin metal sheet 14 that is substantially C-shaped, and a first end metal sheet 16 and a second end metal sheet 18.

The first skin metal sheet 12 defines approximately three-quarters of the outer lateral surface of the heat-exchange unit 2, with the remaining part of the lateral surface defined by the metal sheet 14. The latter is configured for being joined to the metal sheet 12 so as to complete the lateral surface of the unit 1 and moreover has two openings set against one another (in a position corresponding to the baffle W), which define the ports 2IN and 2OUT. In the preferred embodiment illustrated herein, the openings 2IN and 2OUT are substantially D-shaped, so that the fact of them being set up against one another defines an interface for the first flow path with the external environment having a double-D shape, or else a flattened-O shape. The end metal sheets 16, 18 are substantially tray-shaped with a border that fits on the metal sheets 12 and 14 for coupling therewith. The metal sheets 16, 18 are moreover provided with a set of eight holes each, where each hole is identified by the reference 16H for the metal sheet 16, and 18H for the metal sheet 18. The holes 16H, 18H have the same shape, size, and arrangement so as to be each coaxial to a homologous hole on the other plate when the metal sheets 16, 18 are assembled on the metal sheets 12, 14. In the embodiment considered herein, the holes 16, 18 have a quincuncial arrangement. Preferentially, in the embodiment illustrated herein, set between the metal sheets 16 and 22, 18 and 24 is a perforated spacer plate DP, which presents a repetition of the holes 16H and 18H (equivalently, 22H and 24H), once again in positions coaxial thereto.

The set of frame metal sheets is visible in both FIG. 5 and FIG. 6 and comprises a first frame metal sheet 20, a second frame metal sheet 21 shaped in a way similar to the skin metal sheets 12, 14 (the metal sheet 21 likewise has two holes corresponding to the ports 2IN and 2 OUT) and configured for fitting on a sequence of metal sheets including a third end frame metal sheet 22 and a fourth end frame metal sheet 24, and the baffle 2W, which is set between the metal sheets 22, 24 and in a position contiguous to the metal sheets 14, 21.

Each metal sheet 22, 24 has a shape substantially similar to that of the corresponding end skin metal sheets 16, 18 and is likewise provided with a plurality of holes 22H, 24H having the same arrangement, shape, and size as the corresponding holes 16H, 18H, so that on opposite sides of the casing 10 there exist pairs of holes 16H, 22H and 18H, 24H that share the same axis when the metal sheets of the first unit 2 are assembled.

As regards the baffle 2W, it is a perforated plate conveniently made up of a plurality of plates set up against one another and connected together.

In this embodiment, the baffle 2W is formed by three distinct portions including a first peripheral portion 26, an intermediate portion 28, and a second peripheral portion 30 joined together in this sequence. Each of the portions 26, 28, 30 has a perimeter characterized by the alternation of shallow grooves and deep grooves. The shallow grooves are identified by the same reference as that of the corresponding metal sheet (26, 28, 30) followed by the letter S, whereas the deep grooves are identified by the same reference as that of the corresponding metal sheet (26, 28, 30) followed by the letter D.

The alternation of shallow grooves and deep grooves on the metal sheets 26, 28, 30 is provided in such a way that, when they are joined together, each shallow groove is joined to a deep groove so as to identify an ensemble of holes 2H arranged quincuncially, where each hole 2H is constituted by the union of a deep groove and a shallow groove. The holes 2H are in a number smaller than the holes 16H, 18H, 22H, 24H, but have a shape and arrangement that is substantially identical so as to be coaxial to them (where there is a correspondence of holes). In fact, the baffle 2W does not extend throughout the width of the casing 10, but starts from the metal sheet 21 between the ports 2IN and 2OUT and terminates before reaching the opposite side in such a way as to define a U-shaped geometry with a first branch that starts from the port 2IN and is delimited laterally by the metal sheet 22 and by the baffle 2W, a second branch that is directed towards the port 2OUT and is delimited laterally by the metal sheet 24 and by the baffle 2W, and a stretch straddling the two branches defined between the free edge of the baffle 2W and the metal sheet 20.

According to an advantageous aspect of the invention, the valve V is coupled to the casing 10 by means of a bridle BR. The bridle BR has three flanges including:
  a first flange FL1 set in a position corresponding to the inlet port 2IN; the flange FL1 is configured for receiving (and does receive in the assembled condition) the first end of the inlet conduit 2P_IN—in particular, the sinus 2S_IN—and provides a valve seat for the valve V when this is in the second operating position;
  a second flange FL2 set in a position corresponding to the outlet port 2OUT; the flange FL2 is configured for receiving (and does receive in an assembled condition) the first end of the outlet conduit 2P_OUT—in particular the sinus 2S_OUT; and
  a third flange FL3 that provides a further valve seat SF3 for the valve V when this is in the first operating position; the person skilled in the art will hence appreciate that in the preferred embodiment represented in the figures, the movement of the valve V is a movement of rotation between the flange FL1 and the flange FL3, along an arc of 90° (the presence of the seat SF3 does not allow the valve V to override the third flange FL3); in certain embodiments, according to the actual geometry of the conduits 2P_IN 2P_OUT and/or of the lobes 2S_IN, 2S_OUT it is possible for the rotation to cover arcs that are slightly greater than 90° (e.g., 92°) or less than 90° (e.g., 87-88°); in the third operating positions the valve occupies the space comprised between the flanges FL1 and FL3.

The valve V is hinged to the bridle BR by means of a pin PF that traverses the bridle BR at the junction between the three flanges FL1, FL2, FL3 (which in turn is set in a position corresponding to the baffle 2W). The bridle BR is moreover preferably made integral with an S-shaped plate FM that provides a support for the actuator ACT_V. Fixing of the bridle BR may be provided, for example, by means of welding to the casing 10.

Each of the three flanges FL1, FL2, FL3 is substantially D-shaped, and in particular with a shape that reproduces that of the ports 2IN and 2OUT and of the valve V. In this way, the bridle BR can be coupled to the casing by setting—like a covering strip—the flanges FL1 and FL2 over the ports 2IN and 2OUT respectively, with the flange FL3 that projects in a direction substantially orthogonal to the other two flanges. Consequently, as a whole the bridle BR is obtained as a substantially T-shaped component, the three flanges of which identify three openings of which:
  a first opening and a second opening are identified, respectively, by the flanges FL1 and FL2 and border the ports 2IN and 2OUT; and
  a third opening is defined by the flange FL3, and forms part of the third flow path; in fact, coupled on the flange FL3 are the rims of the first ends of the conduits 2P_IN and 2P_OUT—in particular of the lobes 2S_IN, 2S_OUT that are not already coupled to the flanges FL1 and FL2.

Hence, the bridle BR functions both as frame for installation of the valve V (and of the actuator ACT_V) and as element of connection between the inlet and outlet conduits 2P_IN, 2P_OUT and the casing 10.

With reference to FIG. 1, FIGS. 2 to 4, and also FIGS. 5 and 6, the second heat-exchange unit 4 includes the second inlet port 4IN for a second thermovector fluid, the second outlet port 4OUT for the second thermovector fluid, and a plurality of cartridge elements 32, which are in fluid communication with the second inlet port 4IN and the second outlet port 4OUT, providing the third flow path F4, and are installed at least partially immersed within the casing 10 of the unit 2 thanks to the axial insertion within a sequence of holes 16H, 22H, 2H (except for the cartridge elements 32 that are located in a position corresponding to the stretch of the path F2 straddling the two branches of the U-shaped geometry), 24H, 18H.

It should in any case be noted that in alternative embodiments it is possible to do without the structure with skin metal sheets and frame metal sheets in favour of a single-layered structure of metal sheets. Whatever the solution chosen, in any case the casing 10 will appear externally as including:
- a plurality of through holes, which are arranged at opposite longitudinal ends (here metal sheets 16, 18, 22, 24) and arranged coaxial to each other so as to receive in pairs a corresponding cartridge element 32;
- a wall (here the metal sheets 14, 21) having a first opening and a second opening, which provide the first inlet port 2IN and the first outlet port 2OUT; and wherein:
- the baffle 2W is a perforated plate set inside the casing in a position contiguous with the aforesaid wall between the first and second openings, where the holes 2H in the baffle 2W have the same position with respect to corresponding pairs of holes on the opposite longitudinal ends so as to receive the corresponding cartridge elements 32.

The cartridge elements 32 are in fluid communication with a first manifold element 34 of the heat-exchange unit 4 and a second manifold element 36 of the heat-exchange unit 4, provided on which are the aforesaid second inlet port 4IN and second outlet port 4OUT, respectively.

Each cartridge element has a longitudinal axis X32 and includes an inlet orifice 32IN and an outlet orifice 32OUT, which project on the outside of the casing 10, in particular with respect to opposite longitudinal ends (metal sheets 16, 18) of the first heat-exchange unit 2 and with respect to the first flow path F2.

Extending between the orifices 32IN and 32OUT is a tubular skirt 32S (illustrated herein as fitted on two control cups having the orifices 32IN and 32OUT), which is immersed within the unit 2 and which, in addition to delimiting the volume within which the second thermovector fluid moves, offers the corresponding element 32 an area of heat exchange for exchange of thermal energy with the first thermovector fluid.

Each cartridge element 32 further includes at least one element made of thermoelectric material, which is connected to a first electrode and a second electrode set preferentially one on the same side as the orifice 32IN and the other on the same side as the orifice 32OUT. The electrodes are designated by the reference 32E in the figures.

In a preferred embodiment, the cartridge elements 32 can be provided in a way corresponding to the thermoelectric cartridge elements of the document No. US 2013/186448 A1. In this case, as may be evinced from an examination of the aforementioned document, each cartridge element 32 includes a plurality of annular elements bearing blocks of thermoelectric material, where the annular elements are connected together in series with wire electrodes that give out on the outside of the cartridge element.

Advantageously, the tubular skirt 32S of the cartridge element 32 may moreover have a corrugated geometry so as to increase the heat exchange area between the first and second thermovector fluids.

In alternative embodiments, the cartridge elements 32 may, instead, be made in a different way, and may in particular be provided with a thermoelectric element in the form of a lining made of thermoelectric material directly exposed to the flow of the second thermovector fluid.

Whatever the embodiment, according to an advantageous aspect of the invention, the electrodes 32E are provided as female electrical connectors 32FC, as illustrated in the cross-sectional view of FIG. 4. The female connectors 32FC may advantageously have a radially deformable end so as to receive a corresponding male connector with a substantially slotted coupling system.

For this purpose, according to an advantageous aspect of the present invention, each manifold element 34, 36 includes an interface for connection to the cartridge elements 32 that is configured for providing a hydraulic connection with a corresponding one of the aforesaid inlet and outlet orifices 32IN and 32OUT (according to the side on which the manifold element is located: 32IN for the element 34; 32OUT for the element 36). This is made possible, among other things, owing to the fact that the orifices 32IN and 32OUT project on the outside of the casing 10, in particular with respect to opposite longitudinal ends (metal sheets 16, 18) of the first heat-exchange unit 2, and with respect to the first flow path F2.

The connection interface is likewise configured for providing an electrical connection with the electrodes 32E or 32FC connected electrically to the at least one element made of thermoelectric material.

With reference to FIG. 2, FIG. 3, and FIGS. 3A-3C, there now follows a description of the structure primarily of the manifold element 34, with the premise that the aforesaid description applies identically, except for minor modifications to the geometry, which are due to installation on the opposite end of the unit 2, to the manifold 36. The reference numbers adopted are in general identical for the two manifolds and designate the same components. In the case where the components are different from the structural and/or functional standpoint, distinct references will be used. It should moreover be noted that the shape of the manifolds is not limited to a specific arrangement of the cartridge elements 32 (a quincuncial arrangement, a quadrangular mesh, etc.), or to a specific position of the respective fixing screws. The manifolds may maintain the structural layout described in what follows even given different arrangements of the cartridge elements and/or different arrangements of the fixing screws (here represented at two opposite corners, but they could be provided in the other two opposite corners, or in all four corners, etc.)

The manifold element 34 includes a tray-shaped head 38 delimited on one side by a flange 40 preferably provided integral with the head 38 (which also bears integrally the port 4IN, 4OUT for the manifold 36). The flange 40 includes a perforated baffle, made in which are through holes 42 in a number and with an arrangement corresponding to those of the holes 16H, 22H (for the manifold 34) and 18H, 24H (for the manifold 36).

Each hole 42 is configured for housing an annular seal 44 preferably made of elastomeric material and provided with an elastic metal ring to ensure gripping of the seal on a tubular element, in this case the inlet and outlet orifices 32IN and 32OUT.

The holes 42 are provided on a surface that is located on the bottom of a recess 46, the depth of which is chosen in such a way as to house at least one between a first plate 48 and a second plate 50 (plates 48', 50', respectively, for the manifold 36) pack-closed together. In the embodiment considered, only the plates 48, 48' are housed within the recess 46, whereas the plates 50, 50' project on the outside. In any case, fixing of the pack of plates 48, 50 and 48', 50' is obtained, for example, by means of screws SC34, SC36 that grip the packs of plates together and on the perforated baffles of the flange 40.

Each plate 48, 50 and 48', 50' is moreover provided with through holes 48H, 50H and 48'H, 50'H in the same number and with the same shape and arrangement as the holes 42; i.e., also these are holes set in a quincuncial arrangement sharing the axes X32 of the cartridge elements 32.

Moreover provided on each of the plates 48, 50 and 48', 50' are one or more recessed paths that—when coupled together—provide channels for passage of electrical connections.

In greater detail, the plates 48, 50 include recessed paths T48, T50, which extend so that they span pairs of holes 48H, 50H. In particular, the plates 48, 50 include four identical recessed paths T48, T50, which extend between pairs of holes 48H, 50H with axes mutually aligned in a plane parallel to the axes X32 and to the plane of the ports 2IN, 2OUT.

The plates 48' and 50' include, instead, three recessed paths T48', T50', which extend so that they span three distinct pairs of holes 48'H, 50'H arranged in diagonal sequences of holes 48'H, 50'H. Each plate 48', 50' includes a path T48", T50" that is substantially S-shaped and extends from a first end hole to a second end hole of the longest diagonal of holes on the two plates 48', 50'.

Furthermore, all the paths T50 and T50' are traversed by through holes 52, 52', inserted in which are male electrical connectors 54, 54' with mushroom-shaped head, which bears upon the inside of the path T50, T50', stably positioning the electrodes 54. The electrodes 54 are moreover electrically connected by means of electrical conductor elements housed within channels constituted by front coupling of homologous paths T48, T50 and T48', T50' and of the paths T48", T50", thus guaranteeing an excellent shielding of the electrical circuitry in regard to any possible infiltration of various liquids and/or contaminating agents.

With reference to FIG. 4, when the manifold elements 34, 36 are fixed at opposite longitudinal ends of the unit 2 (in particular, of the casing 10), the plates 48, 50 and 48', 50' are located fixed to the heads 38, presenting the electrodes 54 in the direction of the ends of the unit 2, and the gaskets 44 come to be blocked between the plates 48, 48' and the flanges 40 in such a way that there is globally created a connection interface, in which:

the gaskets 44 receive within them the inlet orifice 32IN (manifold 34) and the outlet orifice 32OUT (manifold 36), ensuring fluid tightness in regard to any leakage of the second thermovector fluid; and the male electrodes 54 penetrate into the female electrodes 32FC when the manifolds 34, 36 are coupled to the unit 2, thus providing electrical connection according to a pre-set scheme of the elements made of thermoelectric material housed within the cartridge elements 32; here in particular it is a series electrical scheme.

This explains how each manifold element 34, 36 includes an interface for connection to the plurality of cartridge elements 32 that is configured for providing a hydraulic connection with a corresponding one of the orifices 32IN, 32OUT, and is likewise able to provide an electrical connection with a corresponding first electrode and second electrode 32FC, which are located at the opposite ends of each cartridge element 32 and accordingly constitute a positive electrode or a negative electrode.

In this connection, it should be noted that the female connectors 32FC must be made of materials with high electrical conductivity in so far as the elements made of thermoelectric material that can be typically used within cartridge elements such as the elements 32 possess an intrinsic resistance that is of at least one order of magnitude lower than the intrinsic electrical resistance of any commercially available standard connector. For instance, it is possible to make the connectors 32FC of copper or other material having comparable electrical conductivity. Represented schematically in FIGS. 7 and 8 is the diagram of electrical connection between the elements 32 that is created at the moment of joining of the manifolds 34, 36 to the unit 2.

In particular, the schematic representation shows the metal sheets 16 (FIG. 7) and 18 (FIG. 8), i.e., the views from the side of the manifold 34 and the side of the manifold 36, respectively.

The electrical connections indicated schematically by solid arrows obviously have the same arrangement as the paths T48, T50, T48', T50' (except for the connection that starts from the terminal A, which functionally corresponds to the paths T48", T50") on the plates 48, 50 and 48', 50' inside which the electrical conductors are located. Furthermore, it will be appreciated how the electrical interface with the outside world is provided in a position corresponding to the manifold 36 (terminals A and B). At the side of or in a position corresponding to each terminal/electrode a circle is represented combined with the sign + or − to indicate whether the terminal/electrode is positive (+) or negative (−).

To facilitate understanding of the connections between thermoelectric elements within the elements 32, in FIGS. 7 and 8 they are associated to the reference numbers 1 to 8 contained in a circle. The sequence of connection starts from the element 8 (terminal A, FIG. 8) and terminates with the element 1 (terminal B, once again in FIG. 8), where the passage from one element to the next occurs after prior axial traversal of the element itself (from FIG. 8 to FIG. 7 and return). The person skilled in the branch will have no difficulty in understanding that it is—as anticipated—an electrical connection in series.

Operation of the conversion unit 1 is described in what follows.

Figure 13:
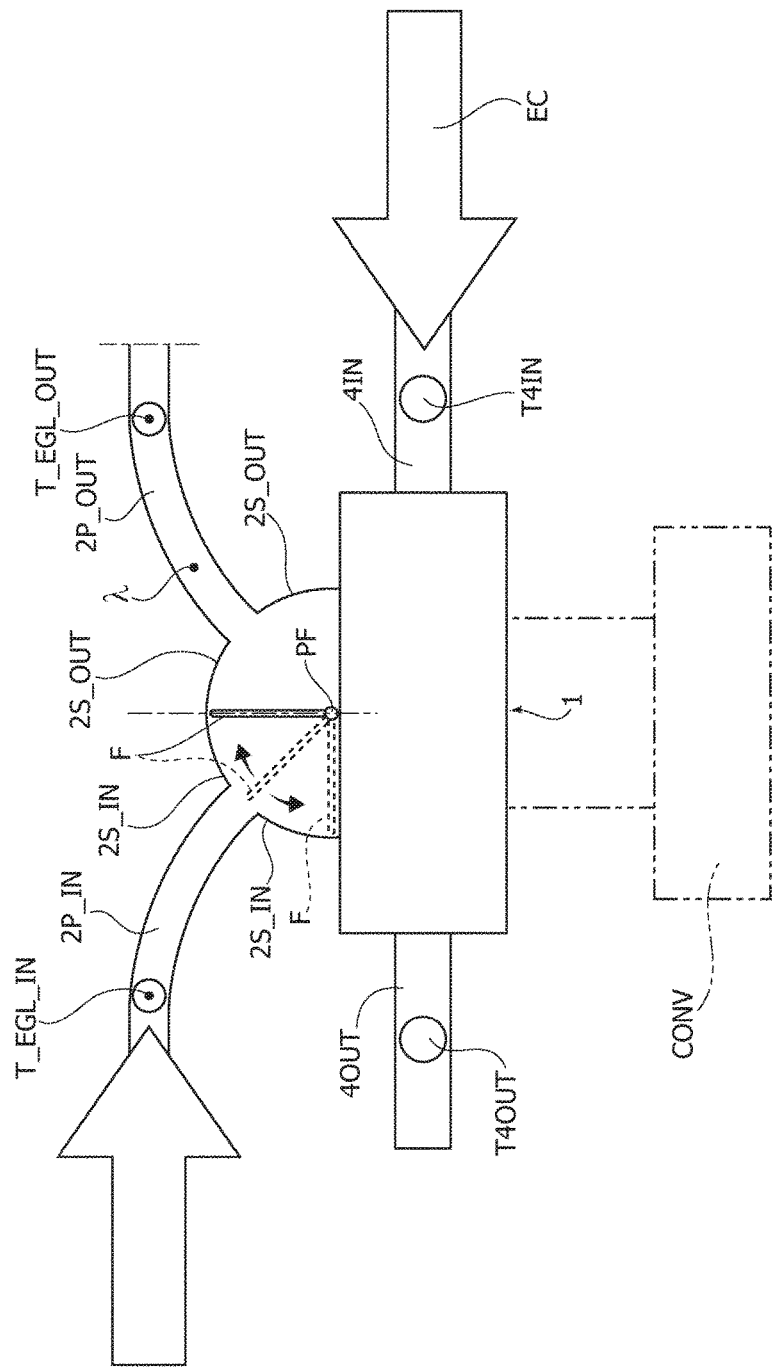
FIGS. 13 and 14 are schematic circuit representations of a mode of use of the conversion unit according to the invention.
Figure 14:
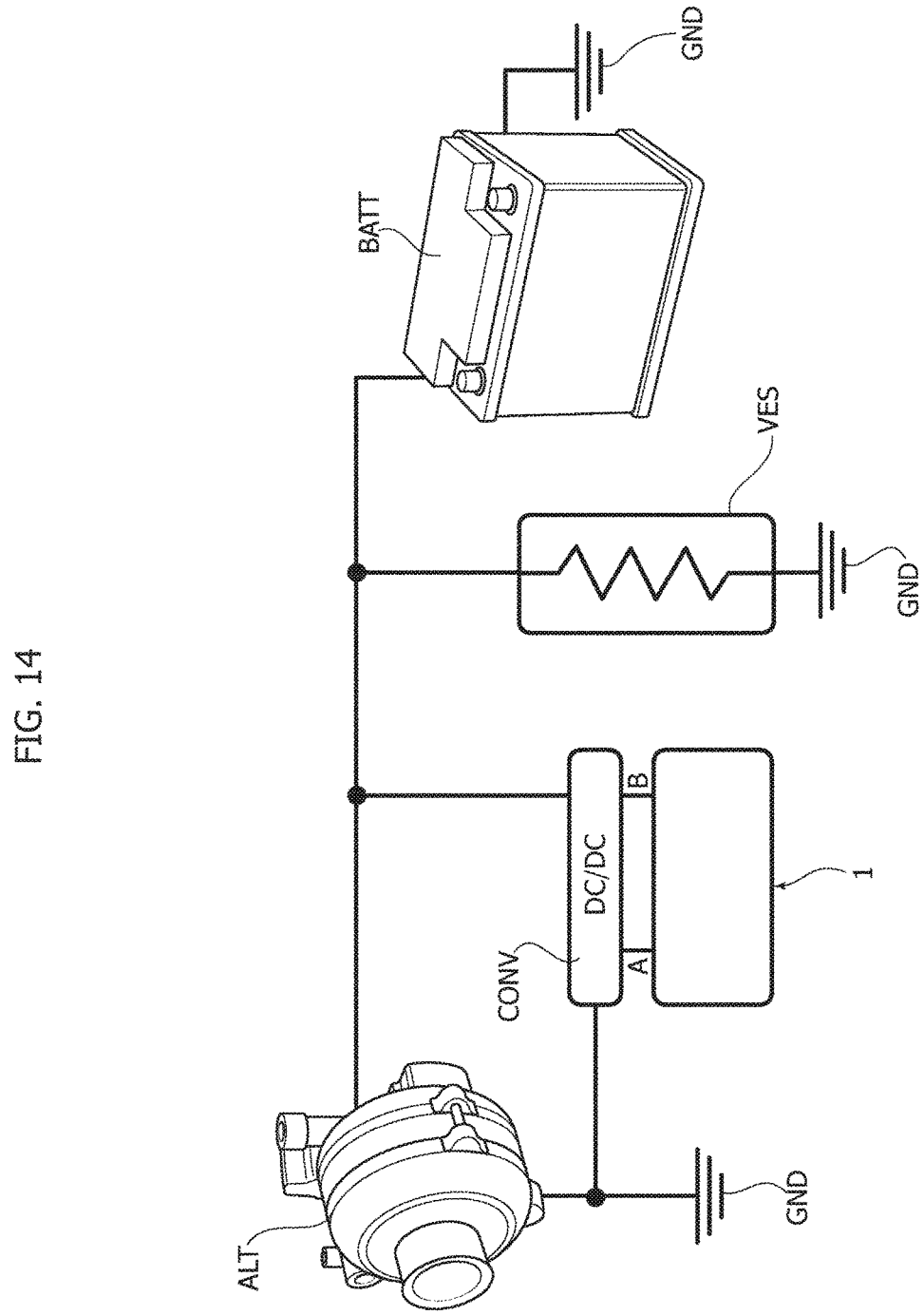

Merely for the purpose of providing a full description of operation of the unit 1 in its most complete configuration (i.e., with the presence of the unit 4), reference may be made to the preferred application schematically illustrated in FIGS. 13 and 14, where the conversion unit 1 is fitted along the exhaust-gas line EGL of a motor vehicle.

In particular, as already mentioned, the second end of the inlet conduit 2P_IN is connected downstream of a first stretch of the exhaust-gas line EGL, typically the stretch immediately downstream of the unit for after-treatment of exhaust gases. The second end of the conduit 2P_OUT is instead connected upstream of a second stretch of the exhaust-gas line EGL, in particular upstream of the stretch that proceeds towards the exhaust outlet, typically at the tail-end of the vehicle.

The valve V is configured for regulating the fraction of the flow of the exhaust gases in the exhaust-gas line EGL that traverses the first flow path F2 to constitute the first thermovector fluid, sending the remaining fraction thereof (if necessary) into the continuation of the line EGL itself through the third flow path. The second heat-exchange unit 4 is supplied with a second thermovector fluid constituted by a liquid coolant for cooling the internal-combustion engine.

Furthermore, the conversion unit 1 is electrically connected to a DC/DC converter designated by the reference CONV, which is electrically connected between a low-voltage branch (at approx. 15 V, and in any case at a voltage lower than 60 V) and a ground branch GND in parallel with an alternator ALT of the vehicle, a battery BATT, and an electrical system of the vehicle VES so as to assist the alternator ALT in recharging the battery BATT and/or supplying electrical energy to the system VES.

When the internal-combustion engine of the vehicle is running, the exhaust gases are sent into the exhaust-gas line EGL after they have traversed a post-treatment unit that varies according to the type of engine and the type of vehicle. The flow of the exhaust gases then reaches the conduit 2P_IN, enters the sinus 2S_IN, and is in view of the valve V. According to the position of the valve V, an amount of from 0% to 100% of the flow of the exhaust gases in the line EGL is sent on to the port 2IN.

In particular, in the first operating position of the valve V (FIG. 9), the hot exhaust gas passes exclusively along the flow path F2 since the valve V bears upon the seat SF3 and occludes the fluid communication between the inlet conduit 2P_IN and the outlet conduit 2P_OUT, imposing upon the first thermovector fluid passage through the first flow path F2.

Figure 10:
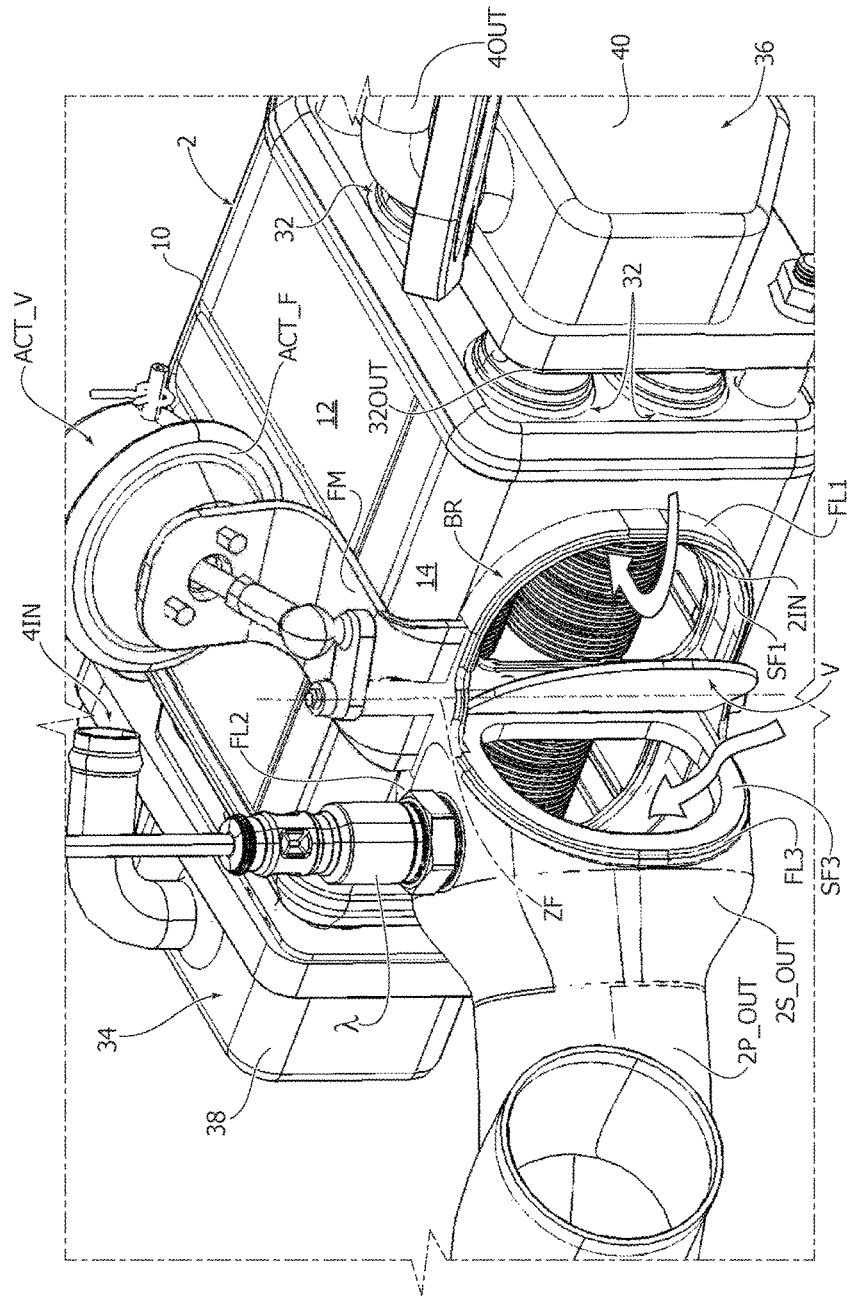
Figure 11:
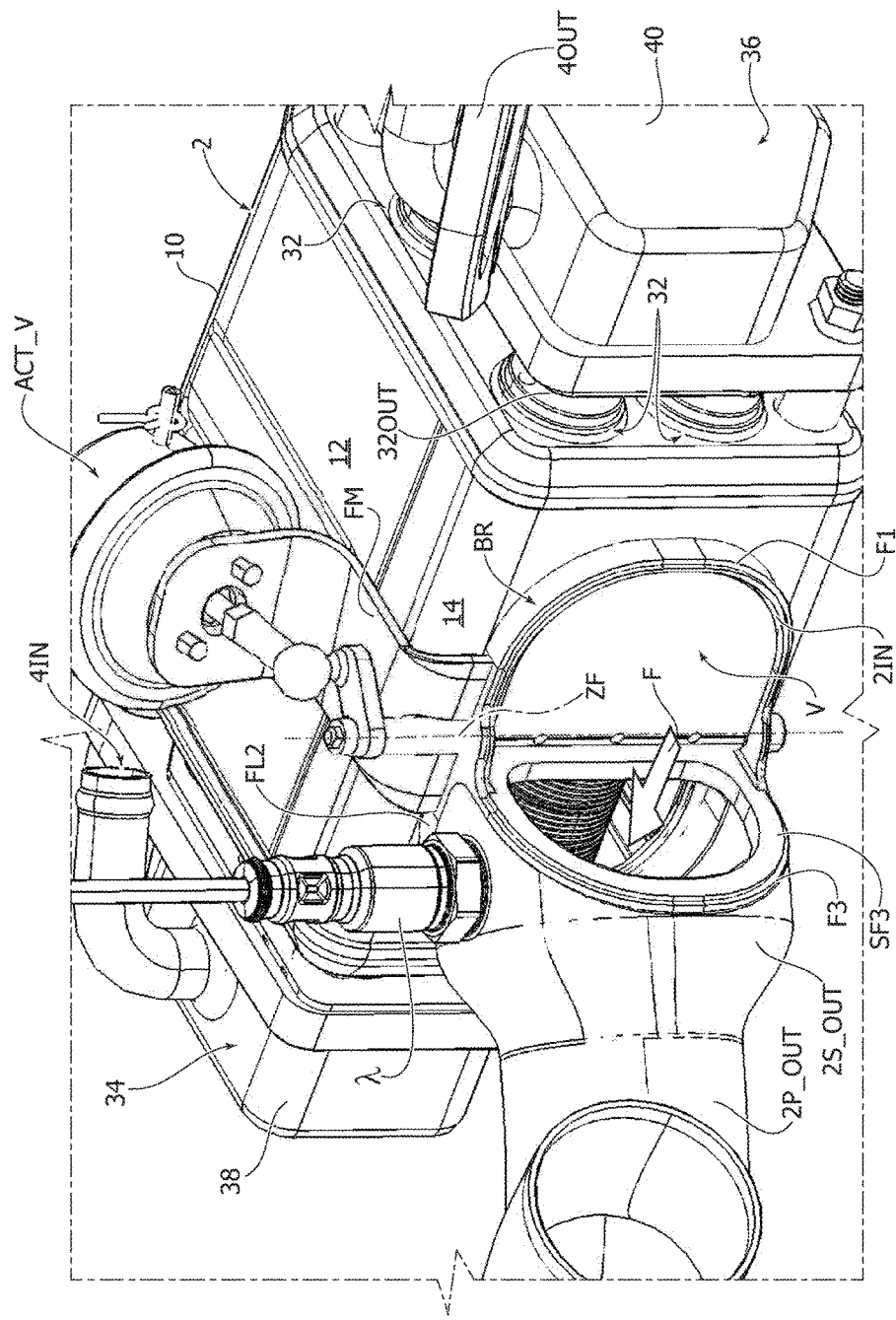

In the (third) operating position of FIG. 10, which represents one of the possible intermediate operating positions of the valve V between the first and second positions, part of the flow of exhaust gases invades the flow path F2, and part invades the second flow path F2'; i.e., it proceeds along the line EGL without traversing the unit 2: the latter fraction of flow traverses the second flow path F2' since the valve V in this position enables a partialized fluid communication between the inlet conduit 2P_IN and the outlet conduit 2P_OUT.

In the second operating position (FIG. 11), the valve V is configured for enabling fluid communication between the inlet conduit 2P_IN and the outlet conduit 2P_OUT, enabling the first thermovector fluid to flow along the second flow path F2'. Preferentially, in the second operating position, the port 2IN is obstructed by the valve V (which is located so that it bears upon the seat SF1) to prevent any undesired entry of thermovector fluid into the first flow path F2. The hot exhaust gas that enters the unit 2 through the port 2IN invades the internal volume of the casing 10, impinging upon the set of elements 32 in the portion comprised between the metal sheet 22 and the baffle 2W (first stretch of the U-shaped geometry of the path F2). Next, the flow of exhaust gases traverses the stretch straddling the first and second stretches of the U-shaped geometry and proceeds, again impinging (but in an opposite direction) upon the cartridge elements 32 in the portion comprised between the baffle 2W and the metal sheet 24.

The person skilled in the art will hence appreciate that, unlike the solution known from US 2013/0186448 A1, the elements 32 are not impinged upon uniformly by the flow of exhaust gases, but are subjected to the action of a flow of hot gas that is at a different temperature and moves in the opposite direction according to its position with respect to the baffle 2W, i.e., according to the branch of the U-shaped path that is being traversed. The range of temperatures along each element 32 is hence non-uniform across the baffle 2, with a minor exception as regards the one or more elements 32 that do not traverse the baffle 2W in so far as they are located in the area straddling the two stretches of the U-shaped path.

At the same time, the third flow path F4 is pervaded by a flow of liquid coolant for cooling the internal-combustion engine of the vehicle, which enters the manifold 34 through the port 4IN, traverses the inlet orifices 32IN, and enters in parallel the ensemble of cartridge elements 32, and then comes out therefrom through the orifices 32OUT, and is then collected in the manifold 36 and comes out through the port 4OUT. As the flow of liquid coolant passes through the cartridge elements 32, it exchanges thermal energy with the flow of exhaust gases that passes within the flow path F2 lapping the elements 32, and thus increases in temperature.

At the same time, the temperature gradient of the fluid within the cartridge elements 32 leads, thanks to the thermoelectric elements within the cartridge elements 32, to conversion of an amount of thermal energy exchanged into potential electrical energy by the thermoelectric effect, thus giving rise to a difference of potential (voltage) that is applied to the connection in series of the elements made of thermoelectric material in the cartridge elements 32.

The electric power generated is then collected on the terminals A and B and sent on to the converter CONV for use on board the vehicle, for example as auxiliary electric power to the alternator ALT.

The increase in temperature of the liquid coolant for cooling the vehicle that flows in the path F4 can be used for quicker set up of climate comfort conditions inside the passenger compartment of the vehicle, for example during cold-starting.

The person skilled in the art will hence appreciate the extreme rationality and compactness of the conversion unit 1: all the hydraulic and electrical connections necessary for operation of the conversion unit are gathered together in a single connection interface for each manifold element 34, 36.

And not only this, but the gaskets 44, albeit maintaining their tightness with respect to leakage of liquid coolant, enable axial thermal expansion of the cartridge elements 32 when these are impinged upon by the flow of hot exhaust gases passing in the flow path F2, thus preventing any undesirable failure of the elements 32 themselves.

Furthermore, all the electrical connections between the elements made of thermoelectric material of the cartridge 32 that are external to the cartridges 32 themselves are set embedded within the paths T48, T50, T48', T50', T48'', and T50'', and—as has been said—are in this way shielded from any possible infiltration of liquids or contaminating agents.

Whatever the operating position of the valve V, the path of the exhaust gas passes once again through the bridle BR, without any branching whatsoever. This provides the unit 1 with a higher fluid-dynamic efficiency thanks to the absence of branch connections for transfer of thermovector fluid to the unit 2. Moreover, the valve V itself operates in a chamber defined by the conduits 2P_IN and 2P_OUT that are connected to the exhaust line, hence sensibly improving integration of the unit 1 on board a vehicle, of whatever kind this may be. Quite simply, when it is possible to shape the conduits 2P_IN and 2P_OUT so that they converge into the corresponding sinus 2S_IN, 2S_OUT, whilst at the same time respecting the geometries of the exhaust-gas line and the encumbrance in the engine compartment of the vehicle, the resulting system is characterized by a minimal perturbation of the flow of exhaust gases as compared to a normal condition, i.e., without installation of the unit 1.

Finally, the inventors have noted how the U-shaped conformation of the flow path F2, in combination with the conformation of the flow path F4, leads to the cartridge elements 32 being impinged upon by a flow of gas at a temperature that differs as a function of the axial position with respect to the elements 32, in particular with reference to the baffle 2W.

This has yielded surprising results in terms of performance of the elements 32, even when commercially available cartridge elements 32 are used and not ones specifically designed for functioning in this way, this constituting further proof of the validity of the conversion unit 1.

The conversion unit 1 is moreover readily adaptable to the needs dictated by a vast number of applications.

In particular, it is possible to envisage solutions in which the set of elements 32 is smaller in so far as it is not necessary to process a (relatively) large flow of thermovector fluid in the second flow path F4.

In these situations, one or more pairs of holes 16H, 22H and 18H, 24H are obstructed by plugs, and the plates 48, 50 and 48', 50' can be replaced by identical plates with recessed paths that provide a different electrical-connection diagram.

Furthermore, the thermal power that enters the unit 2 for energy exchange with the second thermovector fluid can be easily regulated via the valve V by governing the amount of exhaust gases that enters the conversion unit 1.

Figure 9:
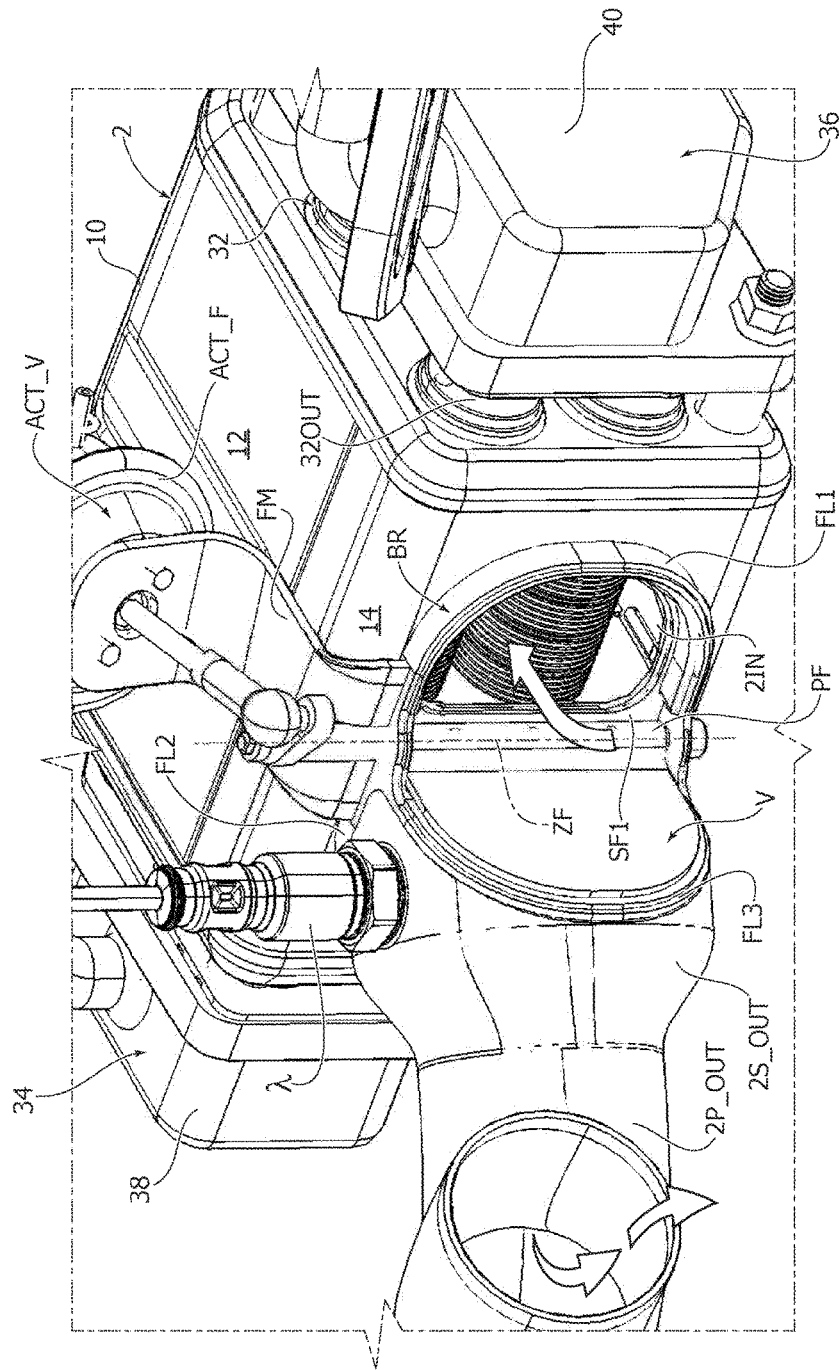
FIGS. 9 to 12 illustrate different operating conditions of the conversion unit according to the invention.

For this purpose, for a more effective monitoring, the conversion unit 1 may be equipped with a sensor system that comprises a sensor for detecting the temperature of the second thermovector fluid at the inlet T4IN and a sensor for detecting the temperature of the second thermovector fluid at the outlet T4OUT (FIG. 9).

As regards the first flow path F2, the sensor system may comprise sensors for detecting the temperature of the exhaust gases upstream and downstream of the valve V, which are designated, respectively, by the references T_EGL_IN and T_EGL_OUT, and monitor the temperature of the gas at the inlet and at the outlet, respectively, of the path F2, thus constituting a further control variable for actuation of the valve F.

Of course, the details of construction and the embodiments may vary widely with respect to what is described and illustrated herein, without thereby departing from the sphere of protection of the present invention, as defined by the annexed claims.

For instance, in the solution illustrated in the figures, the paths of flow F2 and F4 have directions of flow that correspond to a counter-current operation of the energy-conversion unit 1, in order to maximise the heat-exchange efficiency. However, it is possible to set up an equicurrent heat-exchange configuration in two alternative ways:
- by envisaging in the design stage passage of the exhaust gases in the line EGL in the opposite direction (switching round the ports 2IN and 2OUT), or else:
- by reversing the direction of flow of the second thermovector fluid in the path F4 (in this way, the manifold 36 would be provided with the port 4IN, whereas the manifold 34 would be provided with the port 4OUT).

Furthermore, in alternative embodiments, it is possible to envisage providing the electrodes 54 as female electrodes, and the electrodes 32E as male electrodes, simply by making a connection that is specular with respect to what appears in the embodiment represented in the figures.

Finally, in yet a further alternative embodiment, it is possible to eliminate the heat-exchange unit 4. The casing 10 becomes only a transit volume within which the baffle 2W is set for defining the path F2, and likewise the ports 2IN and 2OUT are retained, as also the bridle BR, the valve V, and the conduits 2P_IN and 2P_OUT. The casing 10 functions itself as heat exchanger with respect to a fluid that laps it on the outside, for example lubricant oil that collects in a sump fixed to the base of the internal-combustion engine of the vehicle. In particular, in this embodiment the installation of the unit 1 is such that the casing 10 is embedded—totally or in part—inside the sump that collects the lubricant oil, functioning as heater (and as temperature moderator) for the oil in the presence of very severe environmental conditions. Moreover possible is a hybrid embodiment in which only half of the casing 10—the part located in a position corresponding to reversal of flow of the path F2 (the saddle of the U-shape)—is immersed in the oil sump, whereas the remaining half, which comprises the ports 2IN and 2OUT—is external and is provided with a unit 4 with half the number of cartridges 32, which would enable joint supply of a minimal amount of electric power to the vehicle and thermal power to the circuit for heating the passenger compartment.

The invention claimed is:

1. A unit for conversion of thermal energy including a first heat-exchange unit defining a first flow path for a first thermovector fluid, the conversion unit comprising:
   a first inlet port for said first thermovector fluid and a first outlet port for said first thermovector fluid provided with said first heat-exchange unit, said first inlet port and said first outlet port being located on one and the same side of said first heat-exchange unit and having a baffle set in between so as to confer to said first flow path a substantially U-shaped geometry;
   wherein said first inlet port and said first outlet port are set alongside one another straddling said baffle, in correspondence of which a valve is set for control of flow of said first thermovector fluid;
   wherein connected to said first inlet port is a first end of an inlet conduit, whereas a second end of said inlet conduit is configured for receiving said first thermovector fluid;
   wherein connected to said first outlet port is a first end of an outlet conduit, whereas a second end of said outlet conduit is configured for evacuation of said first thermovector fluid;
   wherein the first ends of said inlet conduit and said outlet conduit are moreover in fluid communication with one another and define a chamber that houses said valve and a second flow path that develops through said inlet conduit, said chamber, and said outlet conduit; and
   wherein said valve is movable between a first operating position in which it is configured for blocking fluid communication between the inlet conduit and the outlet conduit forcing said first thermovector fluid to pass through said first flow path, and a second operating position in which said valve is configured for enabling fluid communication between the inlet conduit and the outlet conduit, thereby enabling said first thermovector fluid to pass through said second flow path.

2. The conversion unit according to claim 1, wherein said valve further includes at least one third operating position in which it is configured for enabling a partialized fluid communication between the inlet conduit and the outlet conduit, thereby enabling said first thermovector fluid to pass through said first flow path and said second flow path.

3. A unit for conversion of thermal energy including a first heat-exchange unit defining a first flow path for a first thermovector fluid, the conversion unit comprising:
a first inlet port for said first thermovector fluid and a first outlet port for said first thermovector fluid provided with said first heat-exchange unit, said first inlet port and said first outlet port being located on one and the same side of said first heat-exchange unit and having a baffle set in between so as to confer to said first flow path a substantially U-shaped geometry;
wherein:
said first inlet port and said first outlet port are set alongside one another straddling said baffle, in correspondence of which a valve is set for control of flow of said first thermovector fluid;
connected to said first inlet port is a first end of an inlet conduit, whereas a second end of said inlet conduit is configured for receiving said first thermovector fluid;
connected to said first outlet port is a first end of an outlet conduit, whereas a second end of said outlet conduit is configured for evacuation of said first thermovector fluid;
the first ends of said inlet conduit and said outlet conduit are moreover in fluid communication with one another and define a chamber that houses said valve and a second flow path that develops through said inlet conduit, said chamber, and said outlet conduit; and
said valve is movable between a first operating position in which it is configured for blocking fluid communication between the inlet conduit and the outlet conduit forcing said first thermovector fluid to pass through said first flow path, and a second operating position in which said valve is configured for enabling fluid communication between the inlet conduit and the outlet conduit, thereby enabling said first thermovector fluid to pass through said second flow path;
said valve is coupled to said first heat-exchange unit by a bridle, wherein moreover said bridle includes:
a first flange set in correspondence of said inlet port, receiving part of the first end of the inlet conduit and providing a valve seat for said valve when in the second operating position;
a second flange set in correspondence of said outlet port, said second flange receiving part of the first end of the outlet conduit; and
a third flange, which provides a further valve seat for said valve when in the first operating position, said third flange having an orientation that is orthogonal to said first and second flanges, wherein moreover said third flange receives a remaining part of the first ends of said inlet conduit and said outlet conduit.

4. The conversion unit according to claim 3, wherein each one of said inlet conduit and said outlet conduit includes a sinus; wherein the sinus of said inlet conduit is received on said first flange and on said third flange, whereas the sinus of said outlet conduit is received on said second flange and on said third flange on an opposite side with respect to the sinus of the inlet conduit.

5. The conversion unit according to claim 4, wherein the sinus of said inlet conduit defines a volume of said chamber within which said valve is movable.

6. The conversion unit according to claim 5, wherein said second flow path passes through said third flange of said bridle.

7. The conversion unit according to claim 1, further including a second heat-exchange unit defining a third flow path for a second thermovector fluid.

8. A unit for conversion of thermal energy including a first heat-exchange unit defining a first flow path for a first thermovector fluid, the conversion unit comprising:
a first inlet port for said first thermovector fluid and a first outlet port for said first thermovector fluid provided with said first heat-exchange unit, said first inlet port and said first outlet port being located on one and the same side of said first heat-exchange unit and having a baffle set in between so as to confer to said first flow path a substantially U-shaped geometry; and
a second heat-exchange unit defining a third flow path for a second thermovector fluid;
wherein:
said first inlet port and said first outlet port are set alongside one another straddling said baffle, in correspondence of which a valve is set for control of flow of said first thermovector fluid;
connected to said first inlet port is a first end of an inlet conduit, whereas a second end of said inlet conduit is configured for receiving said first thermovector fluid;
connected to said first outlet port is a first end of an outlet conduit, whereas a second end of said outlet conduit is configured for evacuation of said first thermovector fluid;
the first ends of said inlet conduit and said outlet conduit are moreover in fluid communication with one another and define a chamber that houses said valve and a second flow path that develops through said inlet conduit, said chamber, and said outlet conduit;
said valve is movable between a first operating position in which it is configured for blocking fluid communication between the inlet conduit and the outlet conduit forcing said first thermovector fluid to pass through said first flow path, and a second operating position in which said valve is configured for enabling fluid communication between the inlet conduit and the outlet conduit, thereby enabling said first thermovector fluid to pass through said second flow path;
said second heat-exchange unit includes a second inlet port and a second outlet port for said second thermovector fluid, and further includes a plurality of cartridge elements;
said third flow path developing from said second inlet port, through said plurality of cartridge elements, to said second outlet port; and
said plurality of cartridge elements being at least in part immersed in the first flow path;
said plurality of cartridge elements are in fluid communication with a first manifold element and a second manifold element having, respectively, said second inlet port- and said second outlet port;
each cartridge element of said plurality of cartridge elements includes an inlet orifice and an outlet orifice for said second thermovector fluid, a heat exchange area for exchange of thermal energy between said second thermovector fluid and said first thermovector fluid, and a first electrode and a second electrode, which are connected to at least one element made of thermoelectric material of the plurality of cartridge element; and said first manifold element and said second manifold element each include an interface for connection to said plurality of cartridge elements configured for providing a hydraulic connection, respectively, with the inlet orifices and the outlet orifices of the plurality of cartridge elements, and an electrical connection, respectively, with the first electrodes and the second electrodes of the plurality of cartridge elements.

9. The conversion unit according to claim 8, wherein said first manifold element and said second manifold element include electrical conductors electrically connected to electrodes configured for coupling, respectively, to the first electrodes and the second electrodes of the plurality of cartridge elements, wherein said electrical conductors provide the electrical connection of the at least one element made of thermoelectric material of said plurality of cartridge elements according to a pre-set scheme.

10. The conversion unit according to claim 8, wherein said first and second manifold elements are fixed to opposite longitudinal ends of a casing of said first heat-exchange unit.

11. The conversion unit according to claim 10, wherein the inlet orifices and the outlet orifices of the plurality of cartridge elements project outwards with respect to said opposite longitudinal ends of said first heat-exchange unit and with respect to said first flow path, so as to couple with the corresponding connection interface on the first manifold element and on the second manifold element.

12. The conversion unit according to claim 10, wherein said casing includes a first plurality of through holes set at said opposite longitudinal ends and set coaxially with respect to one another so as to receive in pairs a corresponding cartridge element of the plurality of cartridge elements.

13. The conversion unit according to claim 12, wherein each manifold element includes:
- a header that carries, respectively, said second inlet port or said second outlet port;
- a flange connected to said header and including a perforated baffle comprising a second plurality of through holes with the same arrangement as the first plurality of through holes on a corresponding one of said opposite longitudinal ends of said casing, and each housing an annular seal configured for receiving, respectively, the inlet orifice or the outlet orifice of the plurality of cartridge elements; and
- a first plate and a second plate fixed in a packed way to said flange on top of one another and having a third plurality of through holes with the same arrangement with respect to the second plurality of through holes on said perforated baffle in such a way that the inlet orifices and the outlet orifices are received in the third plurality of through holes of the first plate and of the second plate in a packed way and in the annular gaskets housed in said perforated baffle; and wherein extending between pairs of through holes of the third plurality of through holes on the first plate and on the second plate are recessed paths defining, when set on top of one another, channels for housing said electrical conductors and said electrodes configured for coupling, respectively, to the first electrodes and to the second electrodes of the plurality of cartridge elements.

14. A motor vehicle including an internal-combustion engine and a conversion unit according to claim 7, wherein:
the second end of said inlet conduit is connected to a first stretch of an exhaust-gas line of said internal-combustion engine downstream of a unit for after-treatment of exhaust gases, said first thermovector fluid being exhaust gas of said internal-combustion engine;
the second end of said outlet conduit is connected upstream of a second stretch of the exhaust-gas line of the motor vehicle that goes towards an external outlet;
said second inlet port and said second outlet port are in fluid communication with a cooling circuit for cooling said internal-combustion engine, said second thermovector fluid being liquid coolant for cooling said internal-combustion engine; and
said at least one elements made of thermoelectric material being electrically connected to a DC/DC converter connected in parallel to an alternator, a battery, and an electrical system of the motor vehicle.

15. A motor vehicle including an internal-combustion engine and a conversion unit according to claim 1, wherein:
the second end of said inlet conduit is connected to a first stretch of an exhaust-gas line of said internal-combustion engine downstream of a unit for post-treatment of exhaust gases, said first thermovector fluid being exhaust gas of said internal-combustion engine;
the second end of said outlet conduit is connected upstream of a second stretch of the exhaust-gas line of the motor vehicle that goes towards an external outlet; and
said first heat-exchange unit is at least partially immersed in a sump for lubricant oil of said internal-combustion engine.

16. The motor vehicle according to claim 15, further including a second heat-exchange unit defining a third flow path for a second thermovector fluid, wherein provided in a portion of said first heat-exchange unit external to said sump is said second heat-exchange unit with said second inlet port and said second outlet port that are in fluid communication with a cooling circuit for cooling said internal-combustion engine, and wherein said second thermovector fluid is liquid coolant for cooling said internal-combustion engine.

* * * * *